(12) United States Patent
Boulanger

(10) Patent No.: US 10,114,482 B2
(45) Date of Patent: Oct. 30, 2018

(54) COLOR CONTROL

(71) Applicant: Microsoft Technology Licensing, LLC, Redmond, WA (US)

(72) Inventor: Catherine N. Boulanger, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/226,658

(22) Filed: Aug. 2, 2016

(65) Prior Publication Data

US 2016/0342228 A1 Nov. 24, 2016

Related U.S. Application Data

(63) Continuation of application No. 14/458,038, filed on Aug. 12, 2014, now Pat. No. 9,436,296.

(51) Int. Cl.
| | |
|---|---|
| *G09G 5/02* | (2006.01) |
| *G09G 5/06* | (2006.01) |
| *G06F 3/048* | (2013.01) |
| *H04N 5/38* | (2006.01) |
| *H04N 1/60* | (2006.01) |
| *G06F 3/0354* | (2013.01) |
| *G06F 3/03* | (2006.01) |
| *G06F 3/041* | (2006.01) |

(Continued)

(52) U.S. Cl.
CPC ........ *G06F 3/03545* (2013.01); *G06F 3/0321* (2013.01); *G06F 3/041* (2013.01); *G06F 3/0481* (2013.01); *G06F 3/0482* (2013.01); *G06F 3/0484* (2013.01); *G06F 3/04847* (2013.01); *G06F 3/04883* (2013.01); *G06T 11/001* (2013.01); *G06F 2203/0384* (2013.01); *G06F 2203/04101* (2013.01); *G06F 2203/04104* (2013.01); *G06F 2203/04108* (2013.01); *G06F 2203/04807* (2013.01)

(58) Field of Classification Search
CPC combination set(s) only.
See application file for complete search history.

(56) References Cited

U.S. PATENT DOCUMENTS

| | | |
|---|---|---|
| H1506 H | 12/1995 | Beretta |
| 7,003,308 B1 | 2/2006 | Fuoss et al. |

(Continued)

FOREIGN PATENT DOCUMENTS

CN 202742877 U 2/2013

OTHER PUBLICATIONS

International Preliminary Report on Patentability dated Oct. 25, 2016 from PCT Patent Application No. PCT/US2015/044548, 6 pages.

(Continued)

*Primary Examiner* — Wesner Sajous
(74) *Attorney, Agent, or Firm* — Rainier Patents, P.S.

(57) ABSTRACT

The description relates to color information. One example can include a computing device having a display and a digital stylus configured to capture colors from an operating environment. The digital stylus can be configured to wirelessly communicate data relating to an individual color from the operating environment to the computing device. The computing device can be configured to identify a context of the communicated individual color and to control the computing device based upon the individual color and the context.

20 Claims, 21 Drawing Sheets

(51) Int. Cl.
*G06F 3/0484* (2013.01)
*G06F 3/0488* (2013.01)
*G06F 3/0481* (2013.01)
*G06F 3/0482* (2013.01)
*G06T 11/00* (2006.01)

(56) References Cited

U.S. PATENT DOCUMENTS

| | | | |
|---|---|---|---|
| 8,610,744 | B2 | 12/2013 | Harris |
| 8,836,768 | B1 | 9/2014 | Rafii |
| 9,317,130 | B2* | 4/2016 | Krepec .................. G06F 3/017 |
| 9,760,187 | B2* | 9/2017 | Havilio ............... G06F 3/03545 |
| 2003/0063943 | A1 | 4/2003 | Lapstun et al. |
| 2005/0024328 | A1 | 2/2005 | Oldfield |
| 2007/0046649 | A1* | 3/2007 | Reiner ................ G06F 3/03545 345/173 |
| 2007/0262965 | A1 | 11/2007 | Hirai et al. |
| 2010/0134429 | A1 | 6/2010 | You et al. |
| 2011/0181524 | A1 | 7/2011 | Hinckley et al. |
| 2011/0242444 | A1 | 10/2011 | Song |
| 2012/0229417 | A1 | 9/2012 | Badaye |
| 2012/0331546 | A1 | 12/2012 | Falkenburg et al. |
| 2013/0034340 | A1 | 2/2013 | Ota et al. |
| 2013/0113762 | A1 | 5/2013 | Geaghan |
| 2013/0113763 | A1 | 5/2013 | Nungester et al. |
| 2013/0257777 | A1 | 10/2013 | Benko et al. |
| 2013/0342554 | A1 | 12/2013 | Sim et al. |
| 2014/0035843 | A1 | 2/2014 | Zo et al. |
| 2014/0078109 | A1 | 3/2014 | Armstrong-Muntner |
| 2014/0168173 | A1 | 6/2014 | Idzik et al. |
| 2014/0168176 | A1* | 6/2014 | Nowatzyk ........... G06F 3/03545 345/179 |
| 2014/0253468 | A1* | 9/2014 | Havilio ............... G06F 3/03545 345/173 |
| 2014/0306929 | A1 | 10/2014 | Huang et al. |
| 2014/0320433 | A1 | 10/2014 | Ishihara |
| 2015/0029162 | A1 | 1/2015 | Harris et al. |
| 2015/0153832 | A1* | 6/2015 | Krepec .................. G06F 3/017 345/157 |
| 2016/0034052 | A1* | 2/2016 | Shu ..................... G06F 3/03545 345/179 |
| 2016/0371854 | A1* | 12/2016 | Gershon .............. G06K 9/6202 |
| 2017/0200289 | A1* | 7/2017 | Gershon .................. G06T 7/90 |

OTHER PUBLICATIONS

Communication pursuant to Rules 161(1) and 162 EPC dated Mar. 21, 2017 from European Patent Application No. 15753572.5, 2 pages.
Response filed Apr. 25, 2017 to the Communication pursuant to Rules 161(1) and 162 EPC dated Mar. 21, 2017 from European Patent Application No. 15753572.5, 12 pages.
"Color Light-To-Digital Converter with Proximity Sensing", In Proceedings of Texas Advanced Optoelectronic Solutions, Sep. 2012, pp. 1-33, 33 pages.
Fox, Stuart, "Color-Picking Pen Concept Imagines Real-World Photoshop Eyedropper Tool", Published on: Jun. 23, 2009, Available at: <<http://www.popsci.com/gear-amp-gadgets/article/2009-06/real-life-photoshop-tool-grabs-colors>>, 9 pages.
"Full Color", In Photoelectric Sensors, Balluff Inc., Aug. 12, 2007, 4 pages.
Hettiarachchi, et al., "FingerDraw: More than a Digital Paintbrush", In Proceedings of the 4th Augmented Human International Conference, Mar. 7, 2013, 4 pages.
Ryokai, et al., "I/O Brush: Drawing with Everyday Objects as Ink", In Proceedings of the SIGCHI Conference on Human Factors in Computing Systems, Apr. 24, 2004, 8 pages.
Kimiko Ryokai, Stefan Morti and Hiroshi Ishii, MIT Media Lab, Tangible Media Group; "I/O Brush", [Online Available at <<http://tangible.media.mit.edu/project/io-brush>>]; 2004, 87 pages.
Demand and Response filed Feb. 18, 2016 from PCT Patent Application No. PCT/US2015/044548, 16 pages.
Chua, Hazel, "Wacom Realism Stylus Samples Colors from the Real World—If Only It Were Real," Published on Apr. 19, 2012, retrieved at <<http://technabob.com/blog/2012/04/19/wacom-realism-stylus-concept/>> on Jul. 24, 2014, 9 pages.
Liang, et al., "GaussBrush: Drawing with Magnetic Stylus," Proceedings of SIGGRAPH Asia Emerging Technologies, Nov. 28-Dec. 1, 2012, 2 pages.
"Apple Invents an Extendable Stylus Tip for Artist Brush Strokes," Published on Mar. 20, 2014, retrieved at <<http://www.patentlyapple.com/patently-apple/2014/03/apple-invents-an-extendable-stylus-tip-for-artist-brush-strokes.html>> on Jul. 24, 2014, 8 pages.
Varias, Lambert, "Color Picker Pen Might Make That Box of 120 Crayons Obsolete," Published on Aug. 13, 2009, retrieved at <<http://technabob.com/blog/2009/08/13/color-picker-pen/>> on Jul. 25, 2014, 8 pages.
Haller, et al., "Shared Design Space: Sketching ideas using digital pens and a large augmented tabletop setup," Proceedings of the 16th International Conference on Advances in Artificial Reality and Tele-Existence, Nov. 29, 2006, 12 pages.
Weber, Harrison, "This smart pen's ink changes based on whatever color you scan," published on Jun. 11, 2014, retrieved at <<http://venturebeat.com/2014/06/11/this-smart-pens-ink-changes-based-on-whatever-color-you-scan/>> on Jul. 23, 2014, 5 pages.
"Color-Trapping Digital Pen for True-to-Life Artistic Hues," Published on Oct. 27, 2011, retrieved at <<http://gajitz.com/color-trapping-digital-pen-for-true-to-life-artistic-hues/>> on Jul. 24, 2014, 4 pages.
"Color Light-To-Digital Converter," published on Sep. 10, 2012, retrieved at <<http://www.eeweb.com/news/color-light-to-digital-converter>> on Jul. 25, 2014, 2 pages.
International Search Report and Written Opinion dated Nov. 25, 2015 from PCT Patent Application No. PCT/US2015/044548, 11 pages.
Non-Final Office Action dated Feb. 2, 2016 from U.S. Appl. No. 14/458,038, 21 pages.
Response filed Apr. 25, 2016 to Non-Final Office Action dated Feb. 2, 2016 from U.S. Appl. No. 14/458,038, 8 pages.
Notice of Allowance dated May 31, 2016 from U.S. Appl. No. 14/458,038, 13 pages.
"Office Action Issued in European Patent Application No. 15753572.5", dated May 31, 2018, 5 Pages.

\* cited by examiner

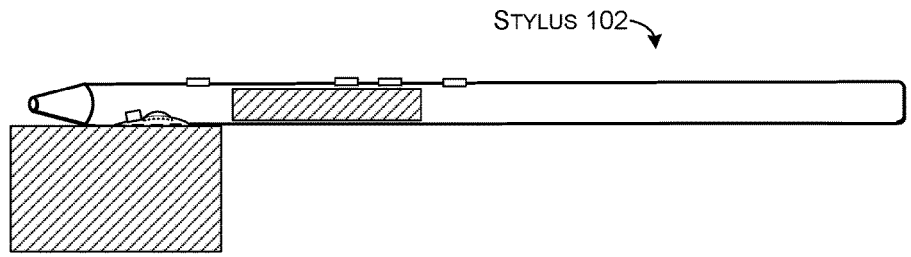
INSTANCE ONE
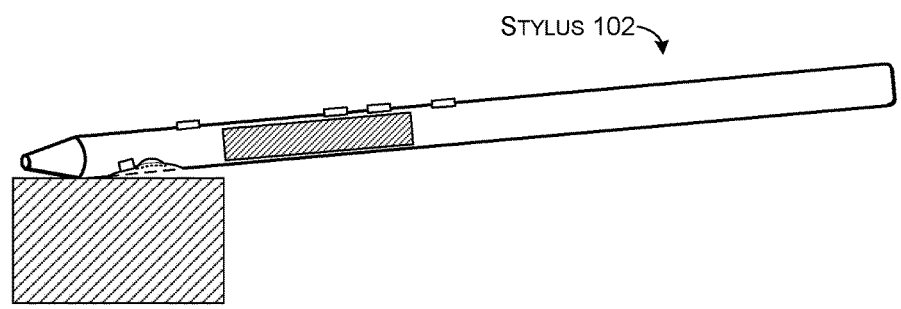
INSTANCE TWO
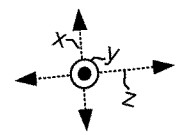
FIG. 17

COLOR CONTROL

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 16A, 16B, and 17 show several color stylus implementations in accordance with some implementations of the present concepts.

DESCRIPTION

The present concepts relate to color, color styluses, and controlling computing devices with color. Color styluses can capture real world colors and can empower the user to use the captured colors to control a computing device. As used herein, the terms 'stylus' and 'digital pen' are used interchangeably.

FIGS. 1-14 collectively show use-case scenarios involving a system 100. The system can include a color stylus (hereinafter, 'stylus') 102 and a companion computing device 104. In this case the computing device is a tablet type computing device. Examples of other computing devices are illustrated and described relative to FIG. 15. Computing device 104 can include a screen or display 106 upon which a graphical user interface (GUI) 108 can be presented. In this case the GUI includes an example 'freehand drawing' graphical window 110. The display 106 can be a touch sensitive display or a non-touch display. The freehand drawing graphical window can allow the user to apply color to pixels of the display, such as to draw with color, paint with color, color characters, etc. For instance, the user may paint blank pixels of the display to have the pixels illuminated with a color from the stylus.

Figure 1:
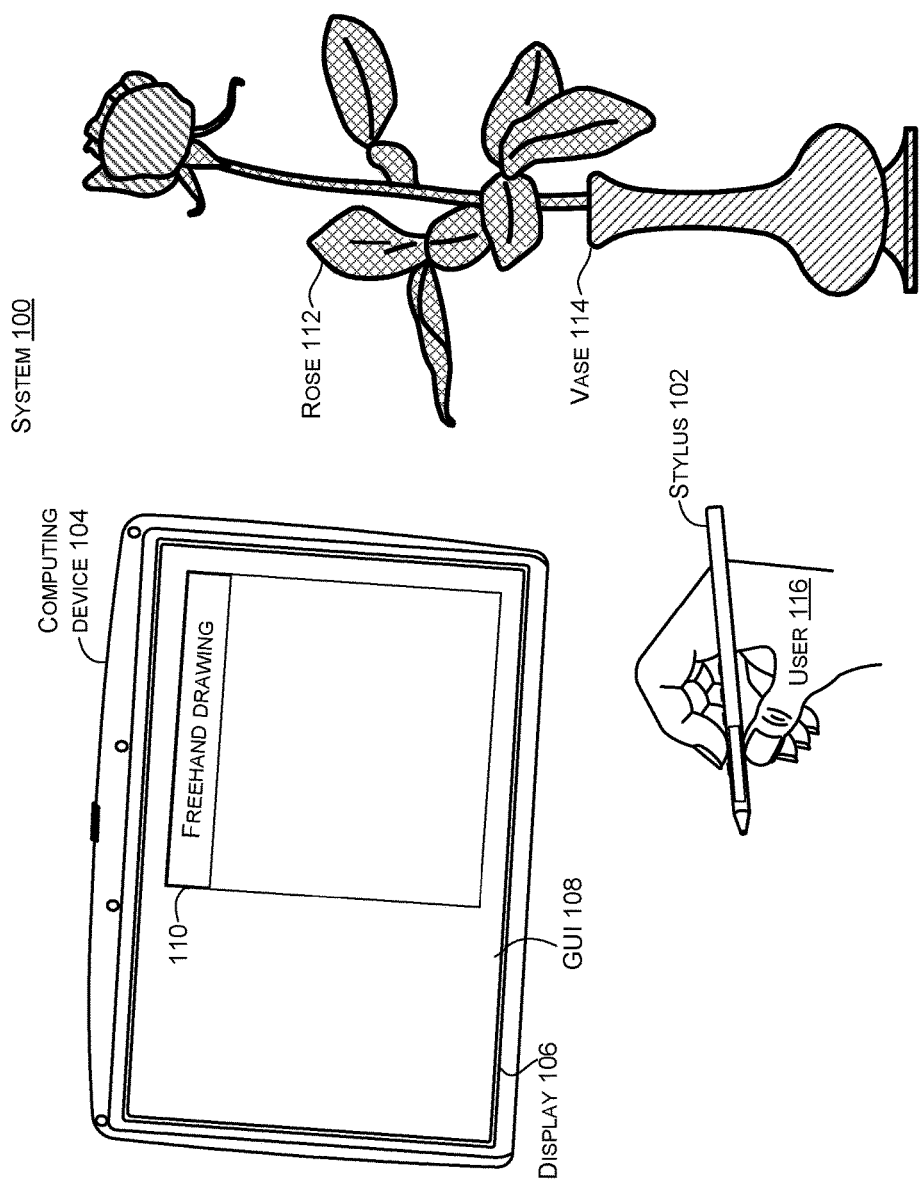
FIGS. 1-14 collectively show example color stylus use case scenarios in accordance with some implementations of the present concepts.

For purposes of explanation, FIG. 1 also shows a rose 112 in a vase 114. The rose includes a red flower (represented by diagonal fill from the upper left to the lower right) and a green stem and leaves (represented by diagonal cross-hatching) and the vase is blue (represented by diagonal fill from lower left to upper right). The rose and the vase are intended to represent examples of colorful items in the user's environment.

Figure 2:
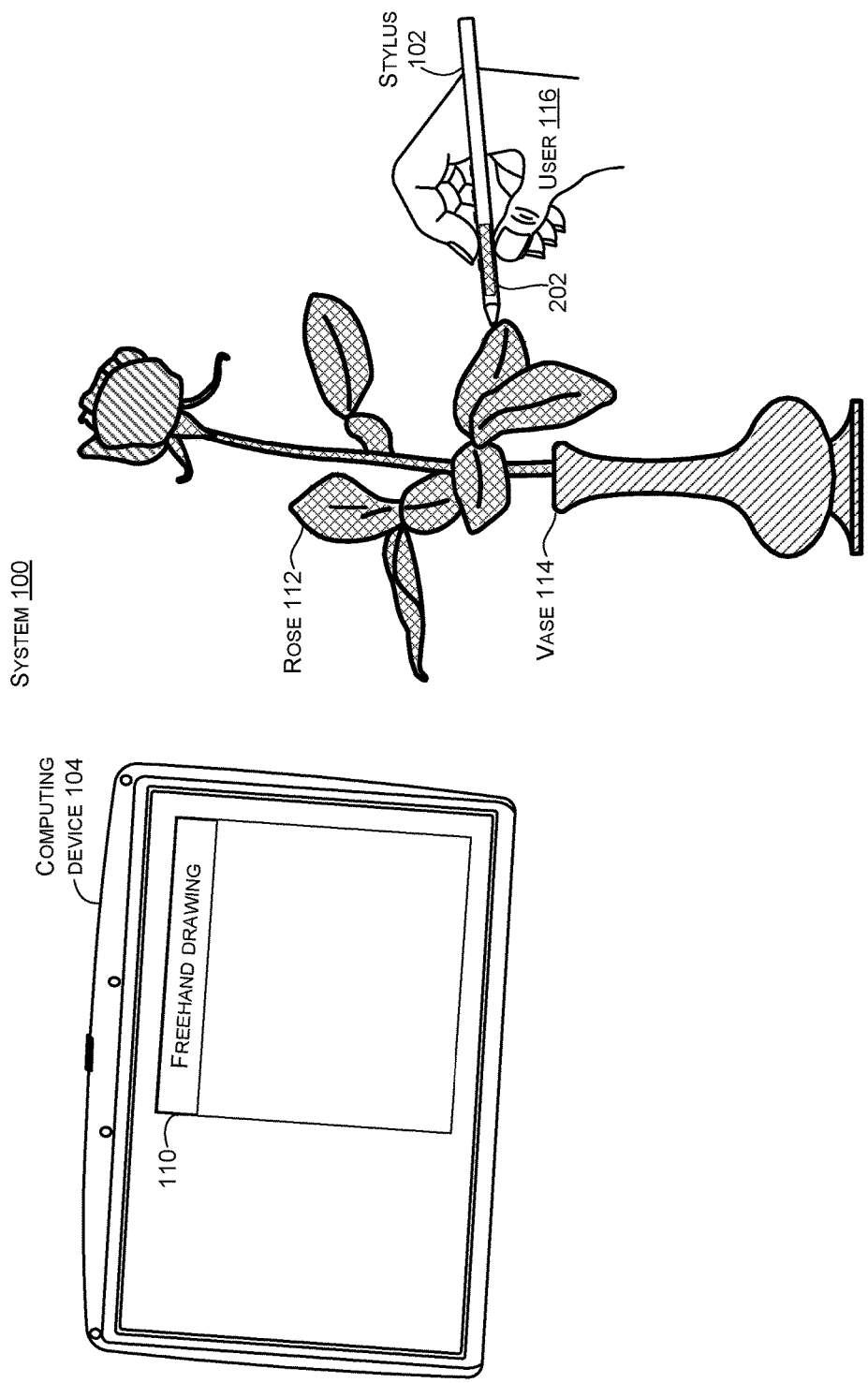

Suppose for purposes of explanation that a user 116 wants to draw with a color from their environment rather than a color option predefined by the stylus 102 or the computing device 104. As shown in FIG. 2, the stylus 102 can enable the user to capture a color (e.g., specific wavelengths of light) from the environment. In this example, the user 116 can capture the green color of the leaves of the rose 112 by touching (or otherwise bringing the stylus proximate to) the leaves of the rose. The stylus can sense the color of the leaves and can display the color sensed from the rose in a display window 202. The stylus can allow the user to select the color, such as via a 'select' input mechanism. (Input mechanisms are described in more detail below relative to FIG. 15).

Figure 3:
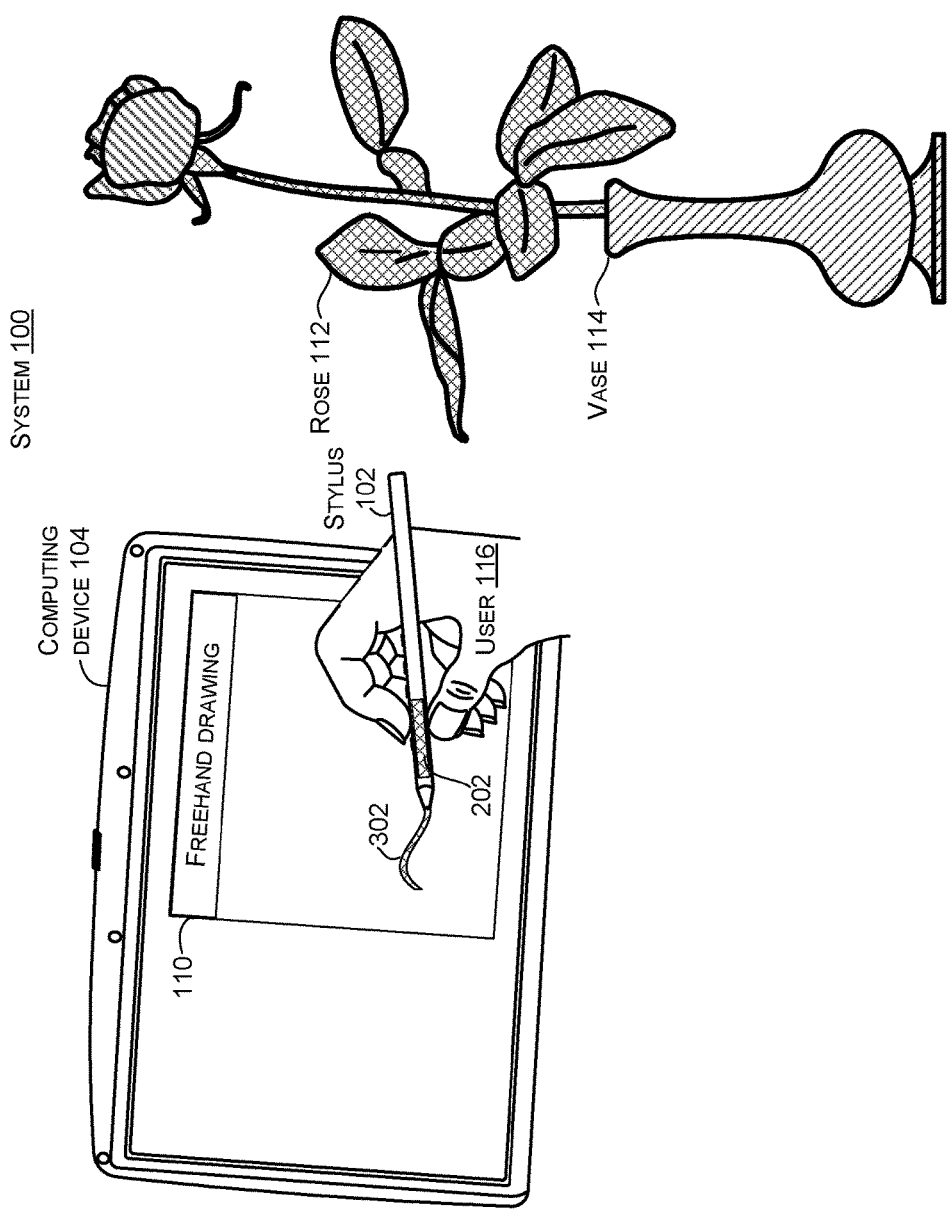

FIG. 3 shows the user using the stylus 102 to draw with the selected color in the freehand drawing graphical window 110 at 302. In this case, the display window 202 on the stylus 102 shows the color that is being utilized (e.g., that is being drawn in the freehand drawing graphical window 110).

FIGS. 4-14 show other ways that the stylus 102 and the companion computing device 104 can enable the user to utilize color. In this implementation, the user can organize content (e.g., documents, photos, music, video, etc.) by color. In this case, assume that the user has previously associated content in the form of folders with the green color from the leaves of rose 112. (An example implementation that allows the user to achieve the association is described below relative to FIG. 18). Now the user can pull up these folders simply by touching the GUI 108 outside of the freehand drawing graphical window 110 with the stylus 102 while the green color from the rose leaves is displayed on the stylus' display window 202.

Figure 4:
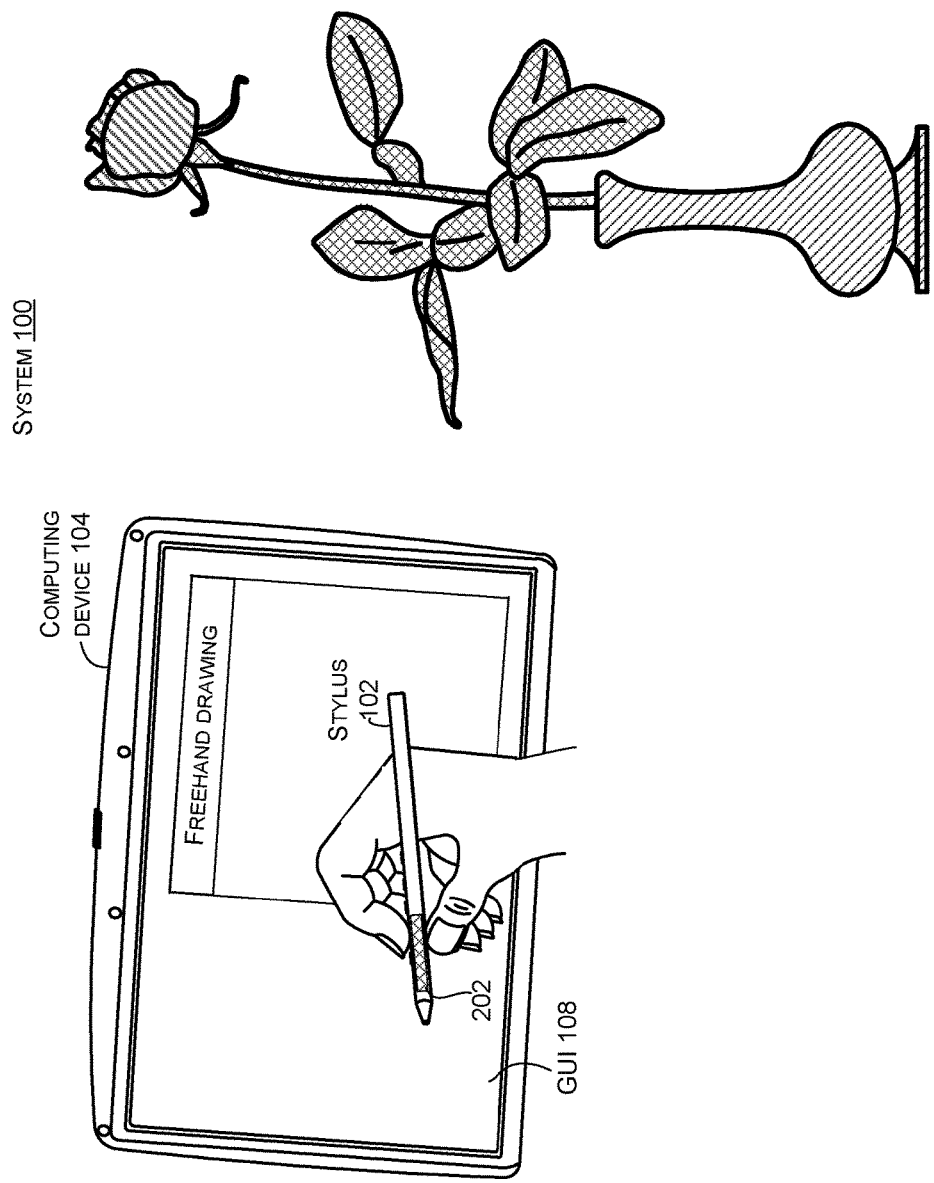
Figure 5:
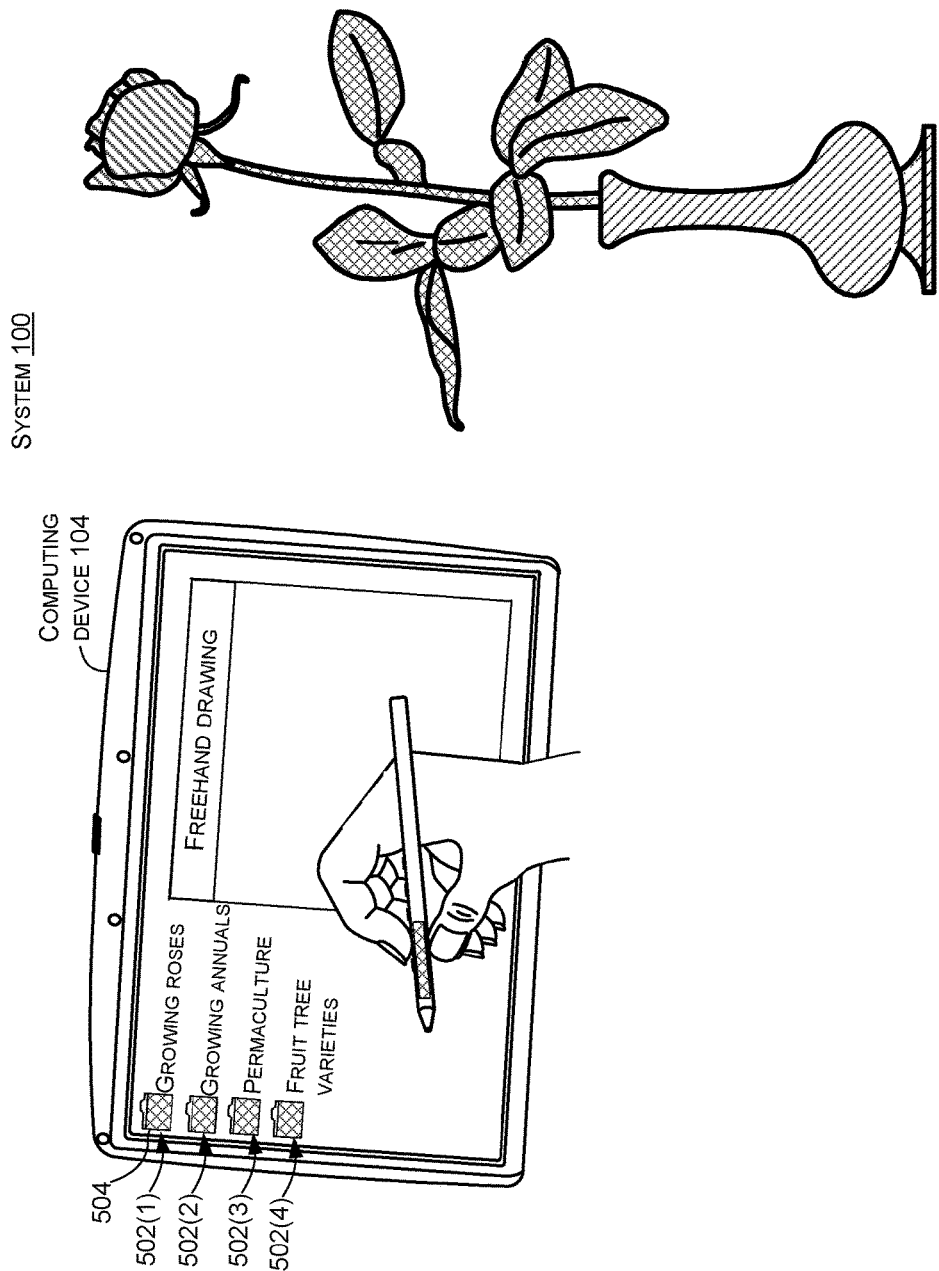

FIG. 5 shows folders 502(1)-502(4) associated with the green color from the rose surfaced on the GUI 108 response to the user action of FIG. 4. Further, each folder includes a visual indicator 504 that it is organized relative to the green color from the rose. In this case, the visual indicator is green coloring of each of the folder icons.

Figure 6:
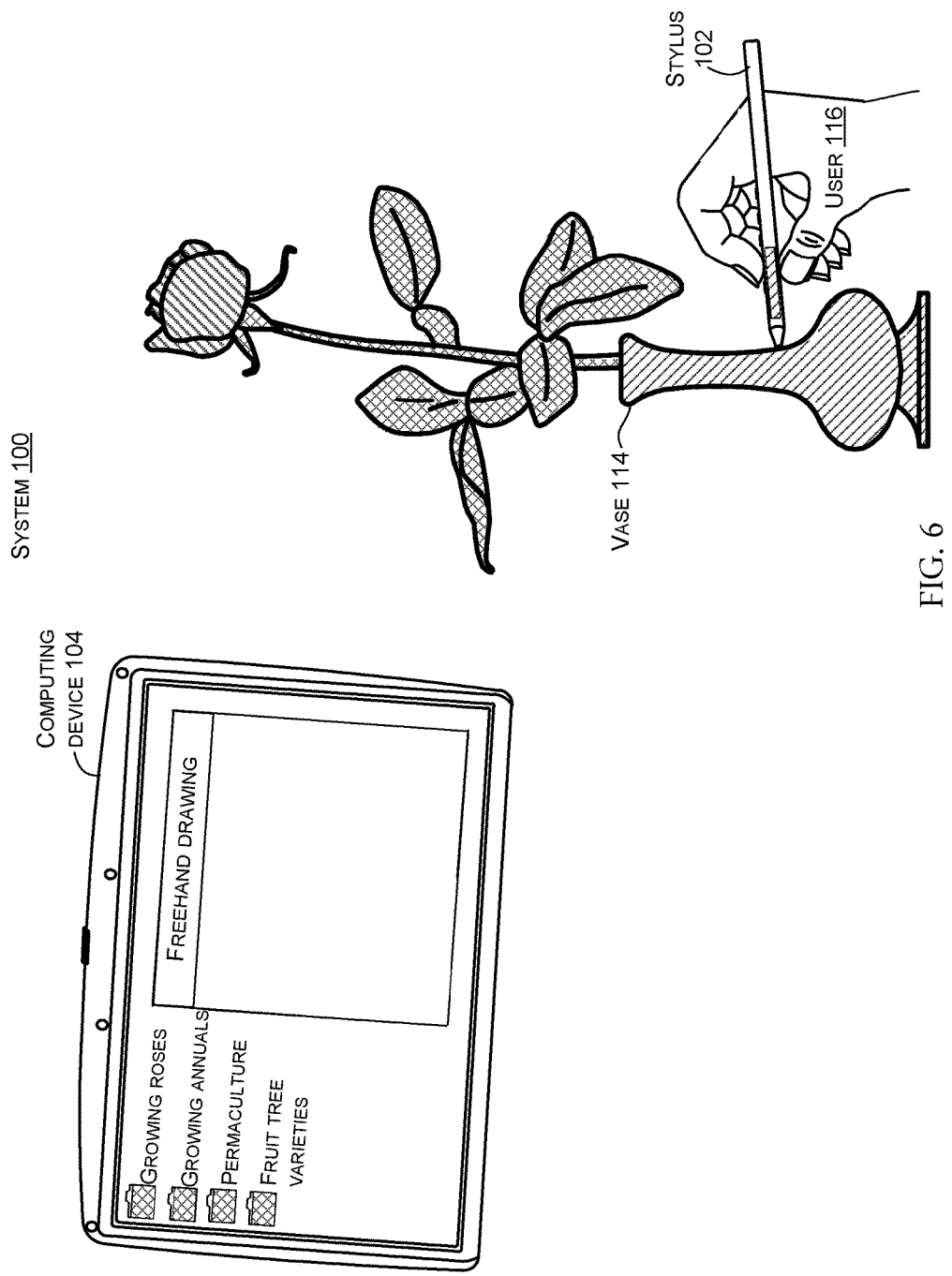
Figure 7:
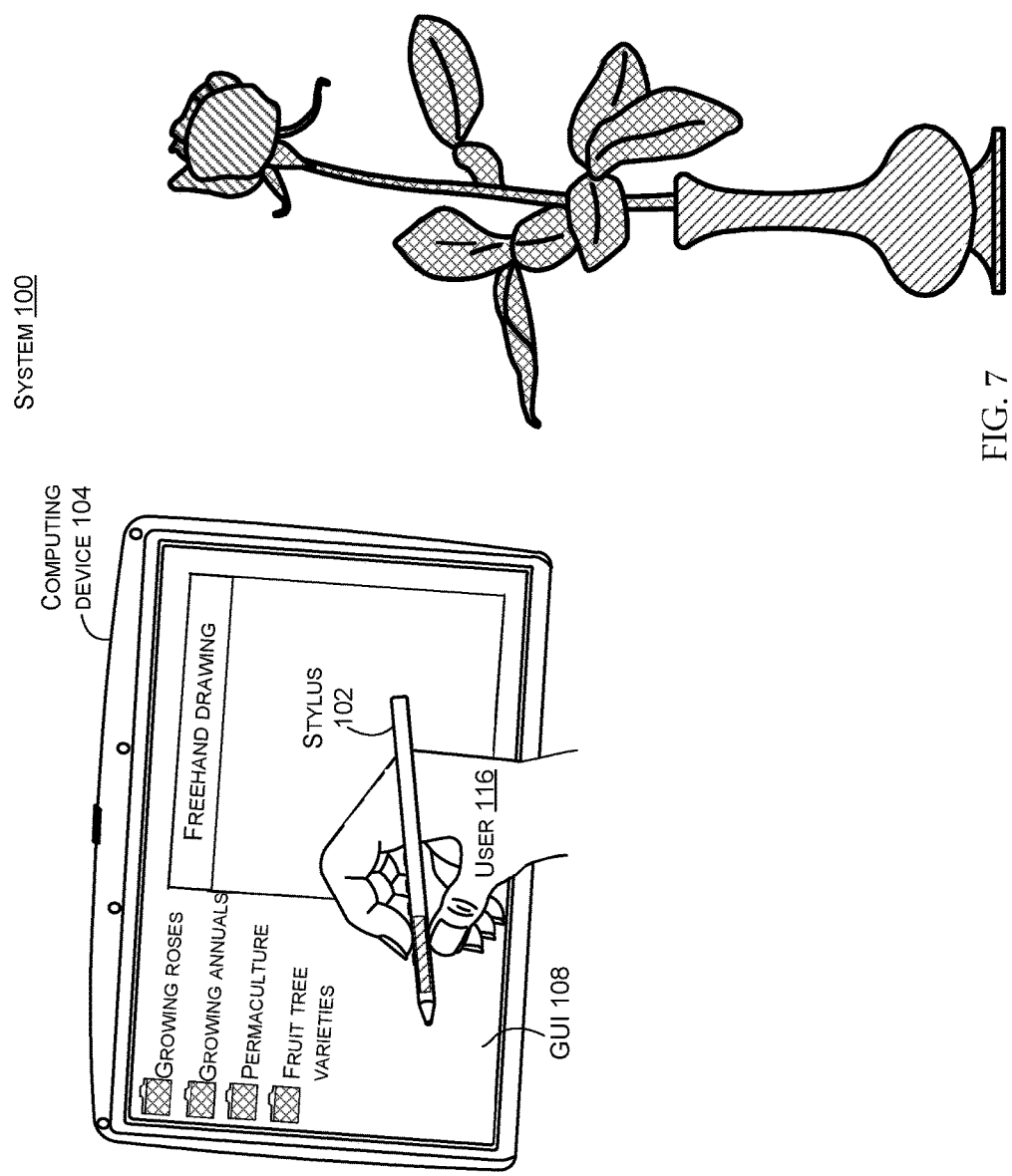

FIGS. 6-7 show another instance of the user using color captured by the stylus to control computing device 104. In this case, the user has associated his/her email application on computing device 104 with the color blue on the vase 114. In FIG. 6, the user can touch the stylus 102 to vase 114 to capture the blue color of the vase. In FIG. 7 the user 116 can touch the stylus 102 to the GUI 108 on the computing device 104 to pull up the email application (shown FIG. 8) which includes a visual indicator that matches the blue color of the vase.

Figure 8:
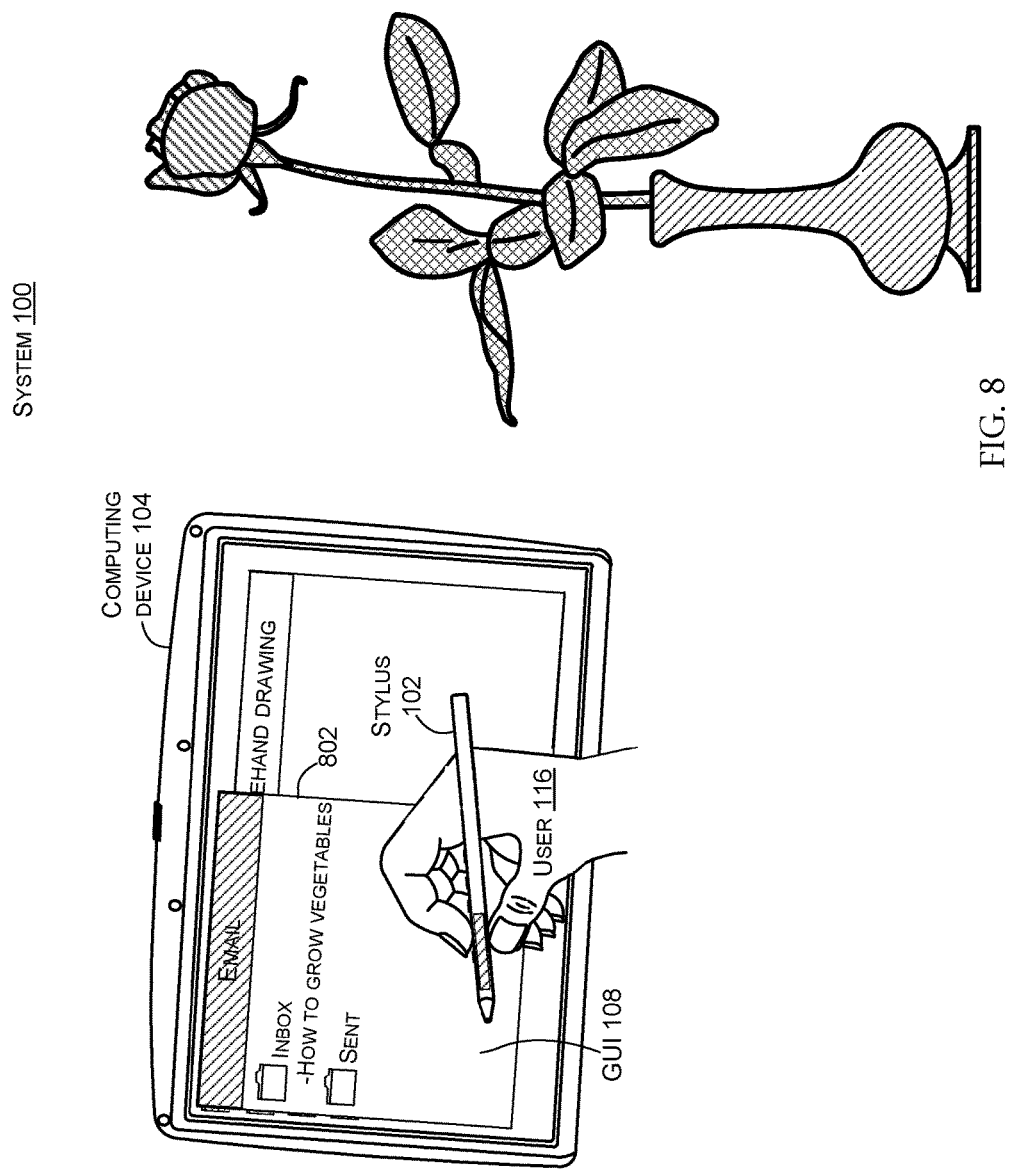
Figure 9:
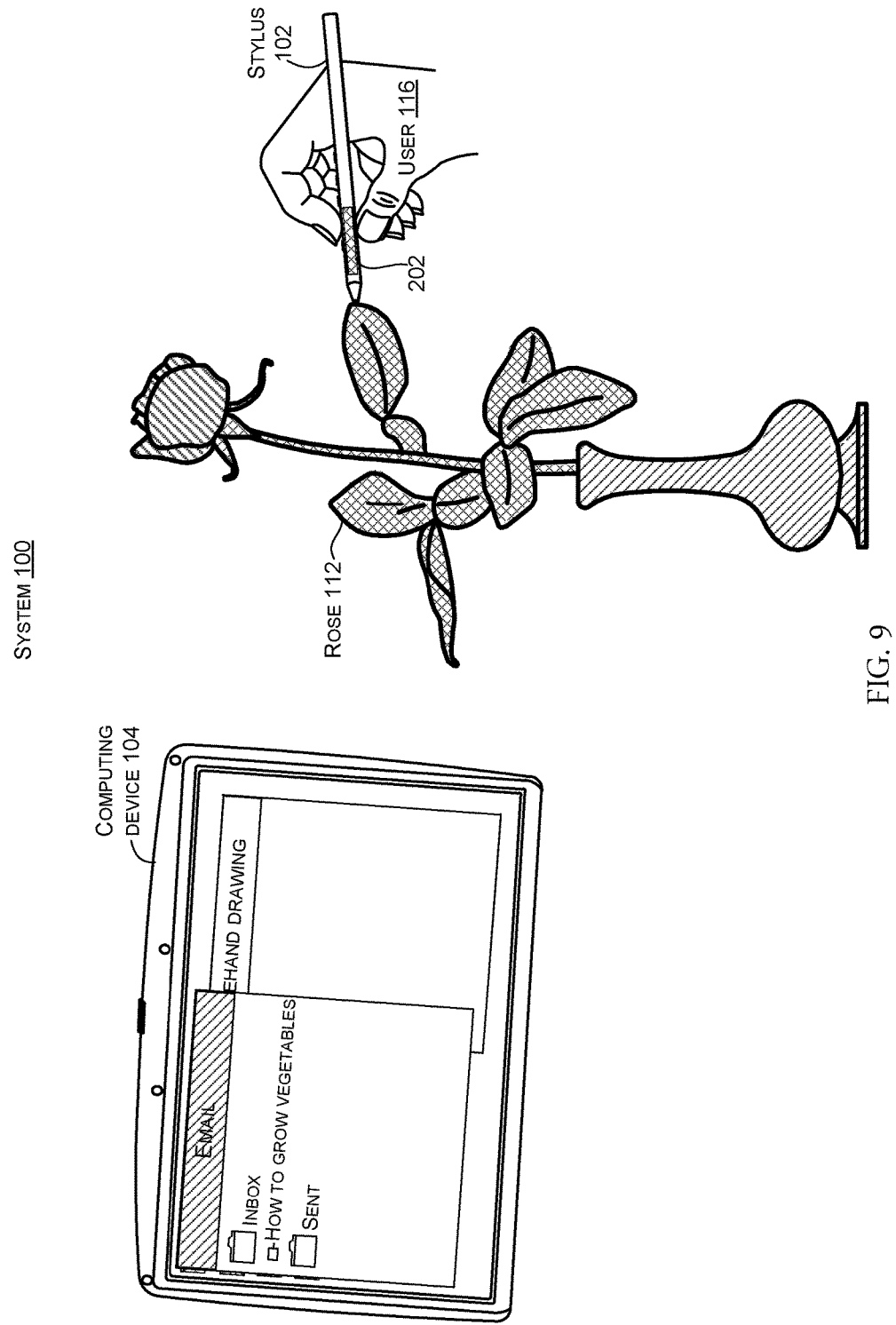
Figure 10:
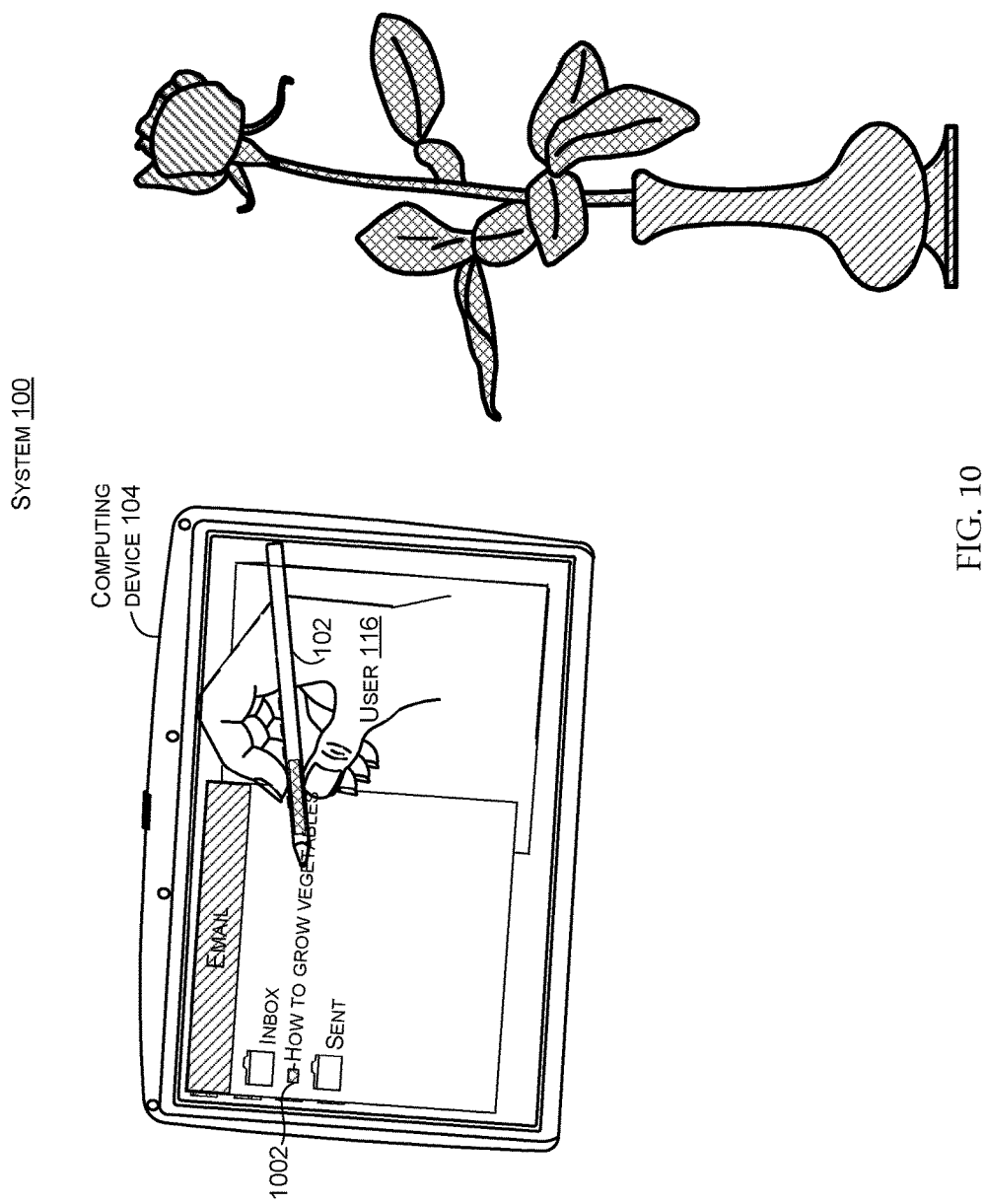
Figure 11:
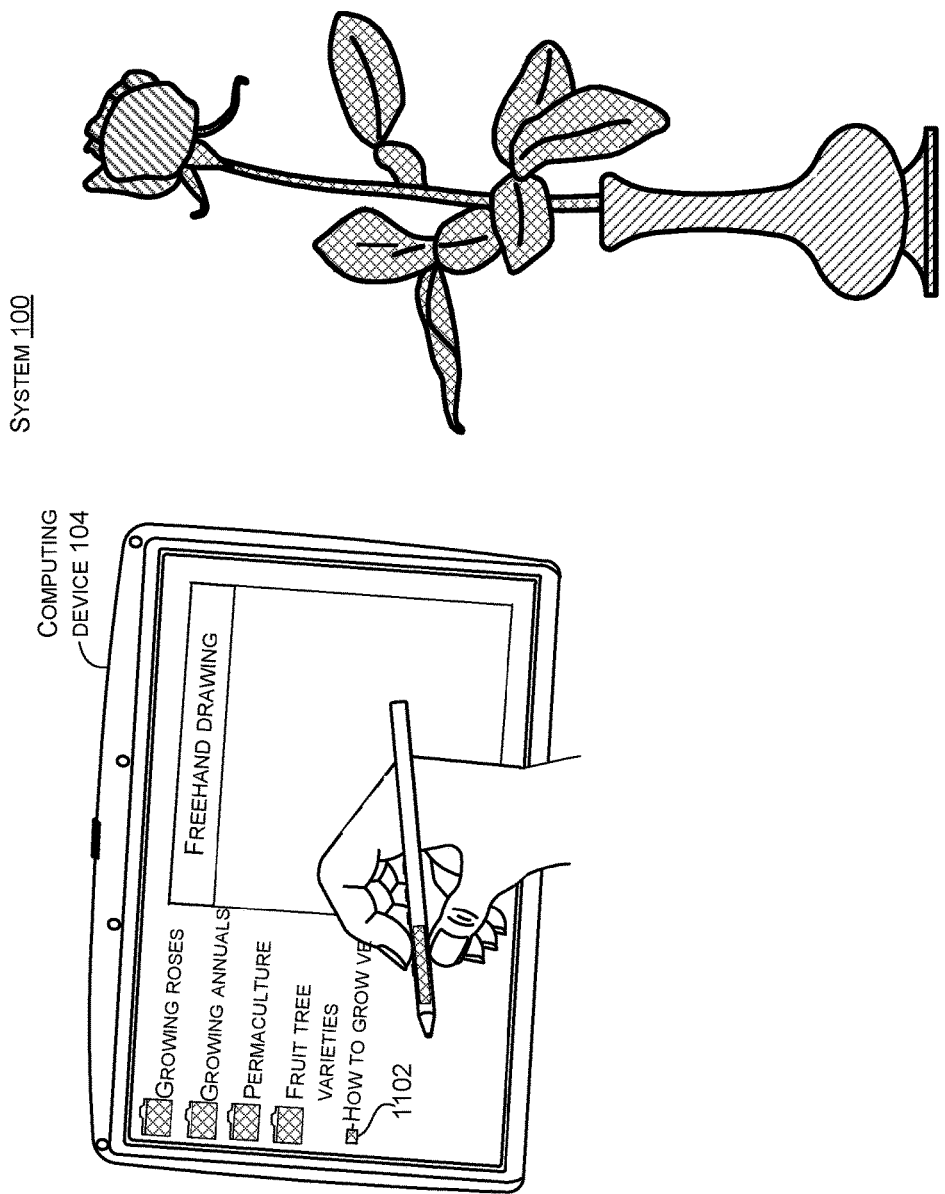

FIG. 8 shows the GUI 108 with email application 802 launched responsive to the user action described relative to FIG. 7. The email application 802 is color coded to the blue color associated by the user with the email application. In this case, the email application displays the user's inbox and sent items. Listed under the inbox is an email titled 'how to grow vegetables'. Assume in this case that the user wants to organize this email with the other 'green' content described above relative to FIG. 5. As such, the user 116 can touch the stylus 102 to the green leaves of the rose 112 as illustrated in FIG. 9 and then touch the email 'how to grow vegetables' as illustrated in FIG. 10. The email remains in the email application and is now color coded at 1002 to the green color. Further, in FIG. 11, the email is populated into the listing of content as indicated at 1102 that the user organized by/with the color green.

Figure 12:
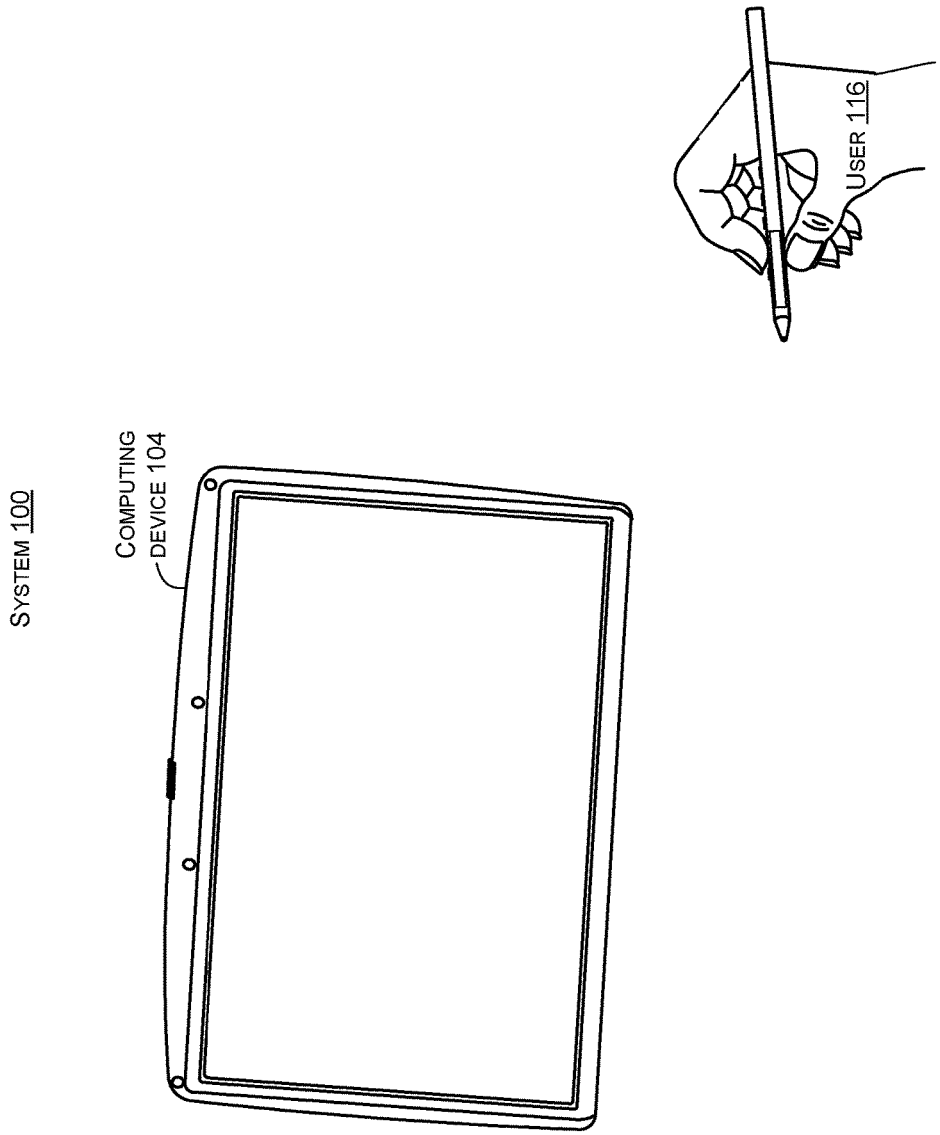
Figure 13:
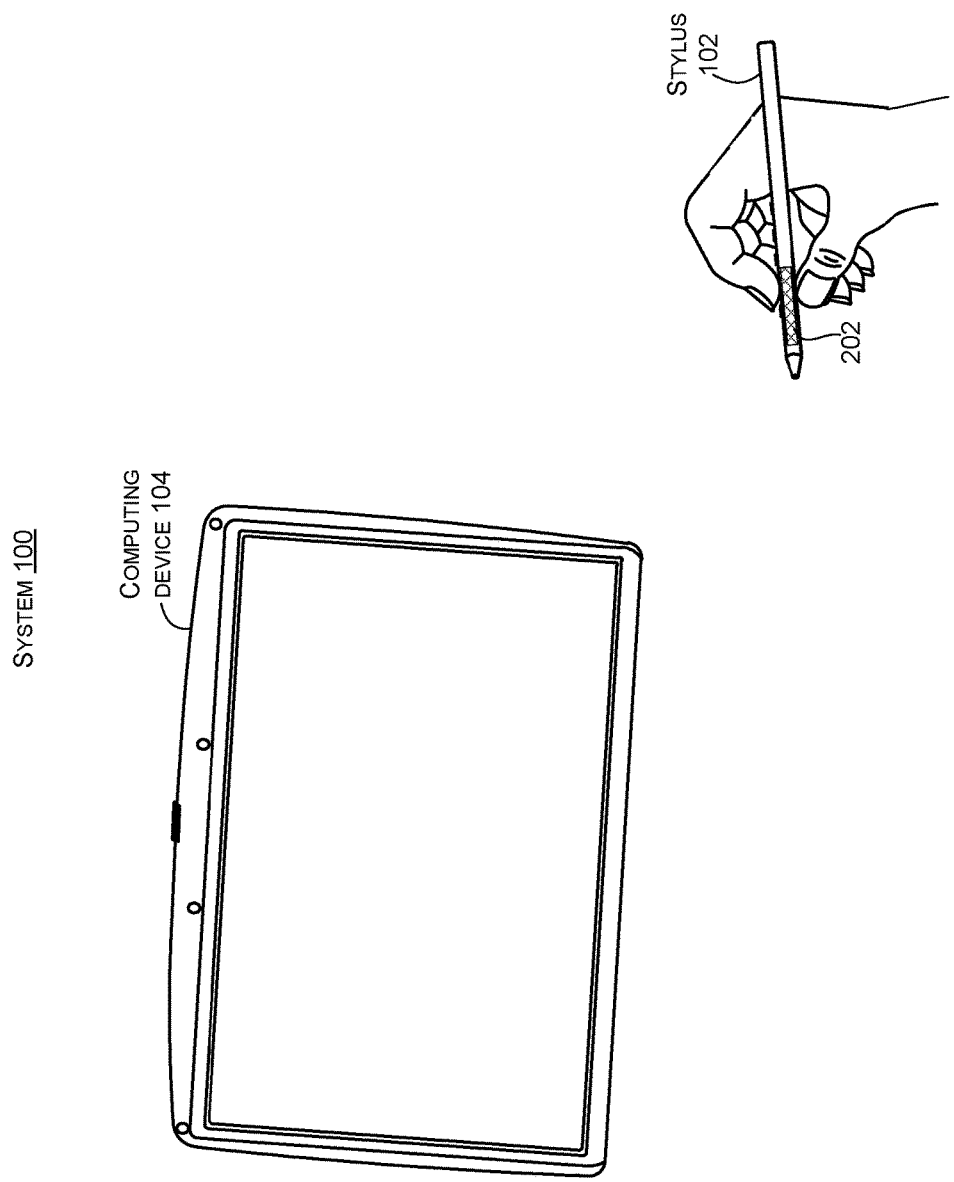
Figure 14:
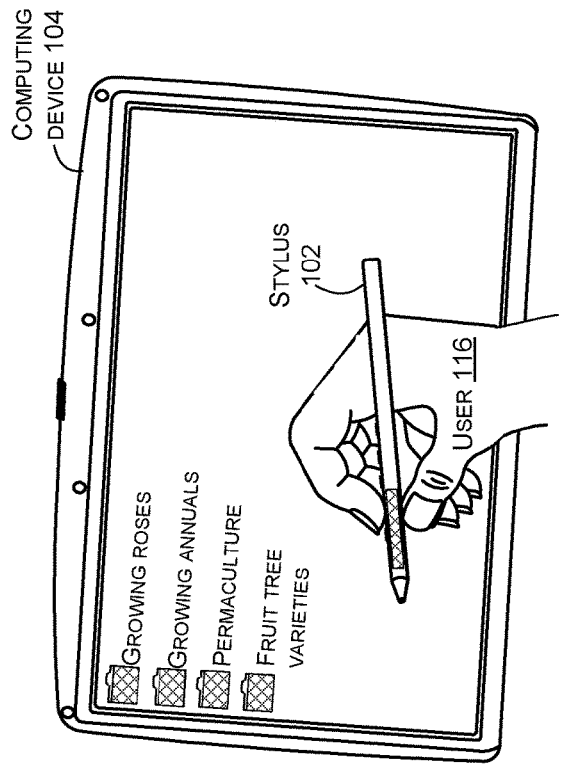

FIG. 12 shows a further color feature offered by the present implementations. In this case, the user 116 has traveled to a different location with the computing device 104 and the rose and vase are not at this location. However, the user can still use color as an input/control tool. In this case if the user desires to access his/her 'green' content the user can recall the green color (as evidenced on display 202) on the stylus 102 as indicated in FIG. 13. As illustrated in FIG. 14, the user 116 can then use the stylus 102 with the computing device 104 to call up the 'green' content on the computing device 104 in a similar manner to FIGS. 4-5.

Viewed from one perspective, the present implementations can offer a stylus interaction that can allow the user to associate a selected color to a specific functionality, such as desktop elements. For instance, if the user wants to search for photos on his/her computing device, instead of typing and searching on the computing device the user can just grab a color he/she has mapped to photos. The computer can also consider context in determining how the user intends to use the color. For instance, if the user contacts the green-selected stylus to the companion device in a drawing application the user likely intends to draw with the color. See for example FIG. 3. In contrast, if the user contacts the companion device at a blank area on the GUI, the user likely intends to invoke the green content organization (e.g., a control function that maps specific content to the specific color). See for example FIGS. 5 and 14.

Figure 15:
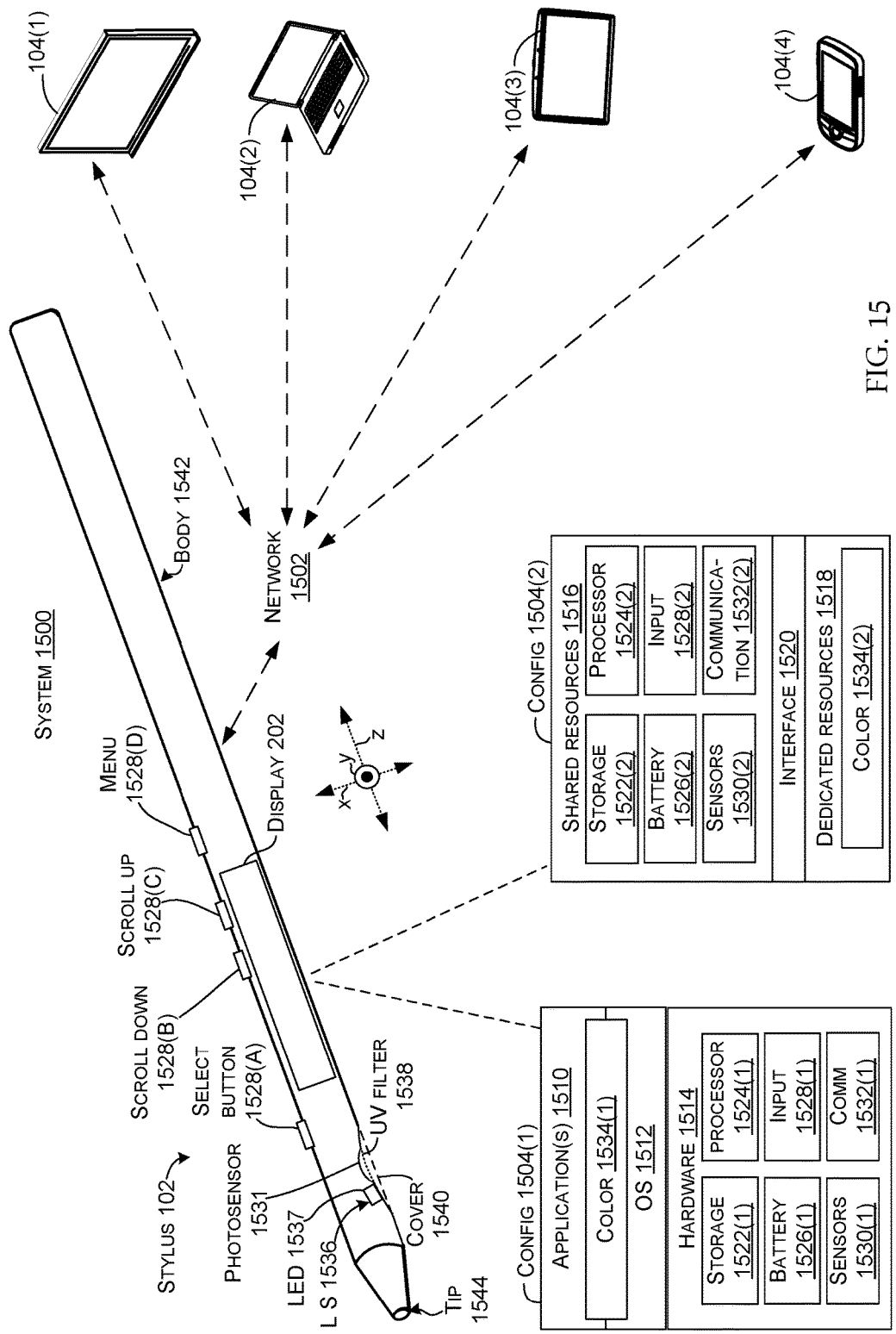
FIG. 15 shows a system example in accordance with some implementations of the present concepts.

FIG. 15 shows details about stylus 102 in the context of a system 1500. In this case, system 1500 includes several example computing devices 104(1)-104(4). Computing device 104(1) is manifest as a digital whiteboard type device, computing device 104(2) is manifest as a notebook computer type device. Computing device 104(3) is manifest as a tablet type computer device similar to device 104 of FIGS. 1-14 and device 104(4) is manifest as a smart phone type device. Stylus 102 can communicate with any one or more of computing devices 104(1)-104(4) via a network(s) 1502. The networks can include various wireless protocols, such as Wi-Fi, Bluetooth, etc., among others to facilitate communications within system 1500 and/or communications between the illustrated components of system 1500 and external resources, such as cloud-based resources, among others.

Two example configurations 1504(1) and 1504(2) are illustrated for stylus 102. Briefly, configuration 1504(1) represents an operating system centric configuration and configuration 1504(2) represents a system on a chip configuration. Configuration 1504(1) is organized into one or more applications 1510, operating system 1512, and hardware 1514. Configuration 1504(2) is organized into shared resources 1516, dedicated resources 1518, and an interface 1520 there between. Note also that the stylus 102 can be thought of as a computing device 104 and any combination of the described elements can alternatively or additionally be manifest on computing devices 104.

In either configuration 1504(1) or 1504(2), the stylus 102 can include storage 1522, a processor 1524, a battery 1526 (or other power source), and input mechanisms 1528. In this case, the input mechanisms are manifest as a select button 1528(A), a scroll down button 1528(B), a scroll up button 1528(C), and a menu button 1528(D). The stylus 102 can also include sensors 1530. A specific sensor that is discussed in detail is a photosensor 1531. Examples of other sensors are described below. The stylus can also include a communication component 1532, and/or a color component 1534. The stylus can also include a light source 1536, such as light emitting diode (LED) 1537 or an organic light emitting diode (OLED) and a UV filter 1538 and/or a protective cover 1540 for the LED 1537 and the photosensor 1531. The components of stylus 102 can be coupled via electrical conductors (not shown to avoid clutter on the drawing page) and/or wirelessly. The various components can be contained in/on a body 1542. The body can terminate in a tip 1544 that can help the user to precisely engage objects with the stylus.

Various types of photosensors 1531 can be employed. Some implementations can employ a photodiode as the photosensor. Other implementations can utilize charge coupled devices (CCDs) e.g., cameras. The photosensors can detect wavelengths of light reflected from objects proximate to the stylus. In one case, a 640×480 pixel CCD can be utilized to obtain integrated sampled colors. This configuration can provide a couple hundred thousand samples of the same color source in one device. The samples can be sorted into a histogram which can be analyzed to achieve high color accuracy. The photosensor 1531 can be calibrated to the properties of the light emitted by the light source 1536.

As mentioned above, multiple types of sensors 1530 can be included in the stylus 102. Examples of sensors can include pressure sensors, inertial sensors, capacitors, accelerometers, gyroscopes, magnetometers, and/or microphones, among others.

The pressure sensors can be positioned to detect when tip 1544 and/or photosensor 1531 is brought in contact with a surface, such as a colored surface or a display of a companion device. Similarly, the capacitors can detect proximity of the tip and/or photosensor to a surface as the tip approaches the surface but before physical contact via capacitance or other mechanism. In some configurations, the capacitors can function as proximity detectors to the companion device so that the stylus can transmit color information (and/or take other actions) as the user moves the stylus toward the companion device. For instance, the stylus may transmit light when in proximity to an optical touchscreen of the companion device.

Accelerometers can detect the movement of the tip and/or photosensor relative to a surface. Gyros can further detect 'twisting' of the tip and/or photosensor and can in combination with the accelerometers distinguish a straight (e.g., lateral movement) from a twisting movement). Microphones and or inertial sensors can be utilized to sense audio signals that can convey texture as the tip and/or photosensor is moved over a color surface. In some examples the color component can interpret the acoustic signals generated due to the friction when the stylus moves across the surface to detect texture. The amount of audio energy emitted from the stylus/surface interaction can be a function of the speed of stylus motion and the physical properties of the surface.

Stated another way, a combination of sensors, such as the photosensor, accelerometer, microphone, and/or gyroscope can be employed on the stylus to determine texture. The color component 1534 can record color information from the various sensors to capture both color and texture, e.g., the stylus can sense and recreate color plus texture (e.g., 3D color).

The color component 1534 can perform various processing on the color information. For instance, the color component can perform time and/or movement averaging as the user moves the stylus over a surface. In this way, the color component can obtain multiple samples that capture a larger area of the surface than if the user held the stylus motionless relative to the surface. The time and/or movement averaging can compensate for differences in speed as the user moves the stylus. For instance, the user may move the stylus in small circles over a portion of the surface that is the desired color. The color component can accurately determine the color properties of the portion of the surface. The determined color can be presented in real-time on display 202, so that the user can adjust their movement to adjust the color. For instance, the user might be moving the stylus over a portion of a leaf that has a vein in it. The vein might be a lighter color than the surrounding surface. The lighter color of the vein can affect the determined color that is presented on display 202. The user can adjust his/her movement so that the stylus avoids the vein. The determined color can change accordingly and then the user can select the determined color on the display 202 when he/she is satisfied via select button 1528(A).

Instances of color component 1534 can occur on the stylus 102 and/or computing device 104. In some implementations, the color component can be manifest as part of the operating system, an application, or an application part, among other options.

The communication component 1532 can allow the stylus 102 to communicate with various computing devices, such as the illustrated companion devices 104(1)-104(4). The communication component can include a receiver and a transmitter and/or other radio frequency circuitry for communicating via various technologies, such as cellular, Wi-Fi (IEEE 802.xx), Bluetooth, etc.

Note that in some cases the color component 1534 on the stylus 102 can be relatively self-contained in processing color information from the photosensor 1531. The color component can cause the color information to be stored on the stylus' storage 1522 and/or communicated to companion devices 104 via communication component 1532. Alternatively or additionally, the color component 1534 may communicate with remote resources, such as cloud-based resources. For instance, the color component may communicate with cloud-based resources relating to a global user profile. The color component can convey color information from the stylus to the cloud-based resources so that any device associated with a user (e.g., a user account) can access the user's color information.

Stated another way, the pressure sensors can indicate that the stylus is touching a surface. At that point the color component can cause color sampling to commence. The color component can determine whether the surface is an emissive surface by causing sampling to be performed with and without light from light source 1536 and can compare the amount of light in the recorded samples. If the amount of light in the samples with the light source turned off is above a threshold, the color component can treat the surface as emissive and turn off the light source for the sampling.

The user can hold the stylus 102 motionless or can move the stylus around during the contact with the surface. The color component 1534 can be aware of the latter condition based upon information from the inertial sensors. In the latter case the color component can perform color averaging based upon speed, time, and/or some other parameters. The sampling and thus the color averaging can start when the stylus touches the surface and can stop when the user removes the stylus from the surface. The detected color may or may not be presented in real-time on display 202 (and/or the companion device) during the contact. Stated another way, the user may be able to see the color evolve response to how they move the stylus (e.g., spend more time moving the stylus over a dark green area than an adjacent light green area and watch the displayed color darken). Thus the user can be provided with real-time feedback and can alter the color as desired by his/her actions.

Note that stylus 102 and computing devices 104(1)-104(4) can be thought of as computing devices. Note that while not illustrated with particularity, individual computing devices 104(1)-104(4) can be implemented similar to the stylus 102 via configuration 1504(1) and/or 1504(2). The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the computer. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and/or flash memory, among others.

As mentioned above, configuration 1504(2) can be thought of as a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), manual processing, or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 16A:
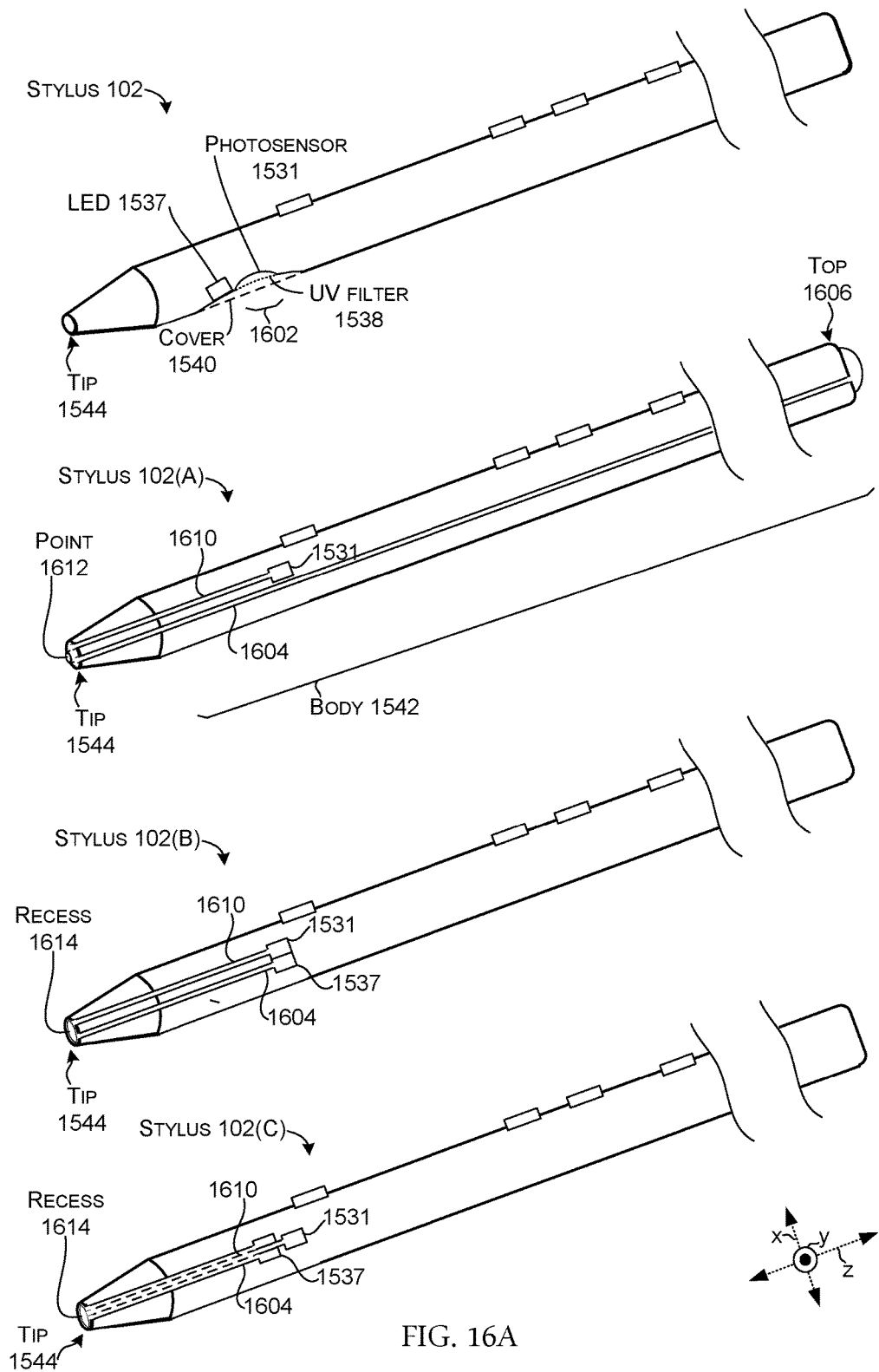
Figure 16B:
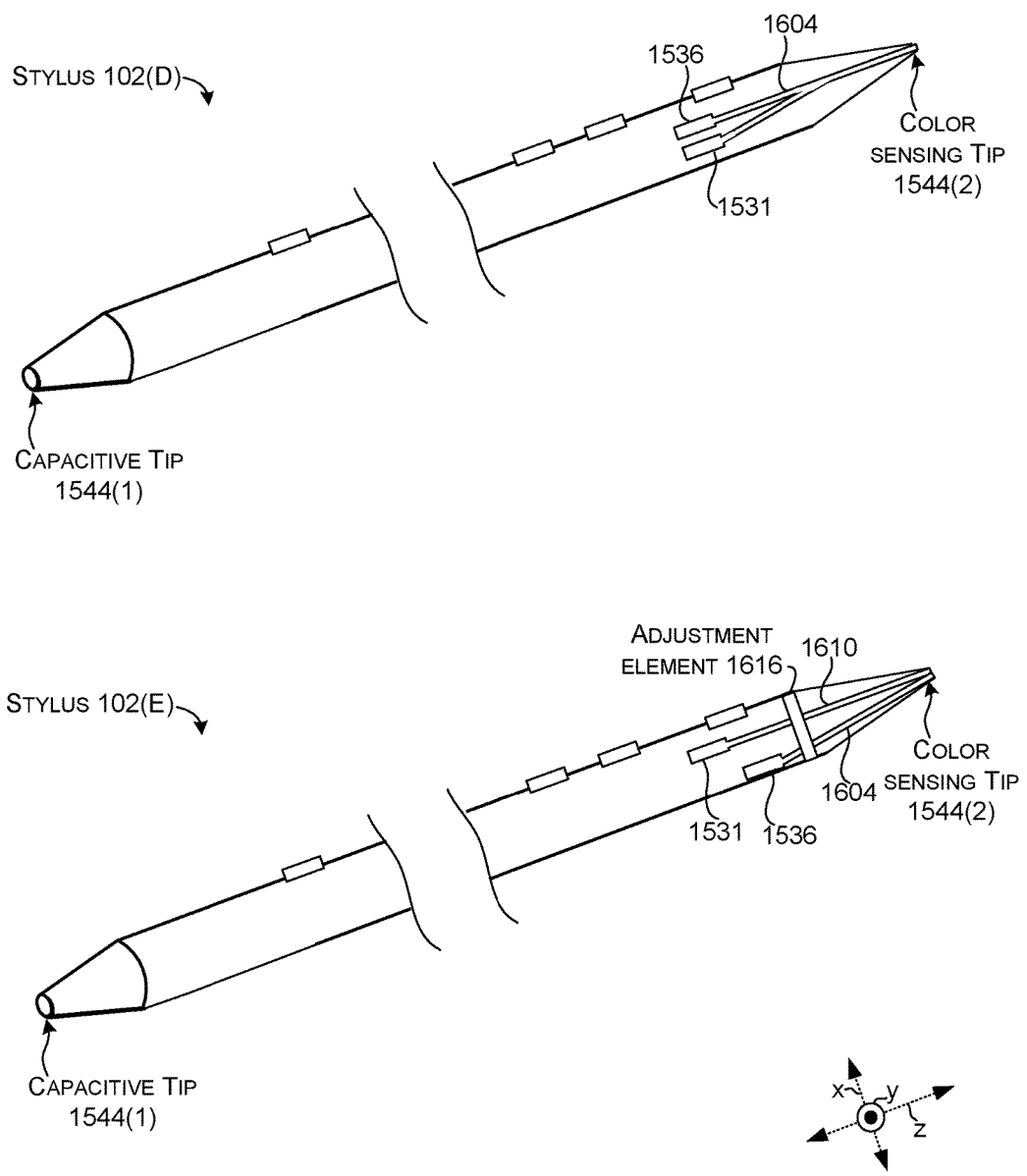

FIGS. 16A-16B compare six stylus layouts. Stylus 102 is recreated from FIG. 15. Styluses 102(A), 102(B), 102(C), 102(D), and 102(E) are newly introduced. In the case of stylus 102, the photosensor 1531 is positioned to sense a region 1602 that is physically separated from tip 1544. In contrast, styluses 102(A)-102(C) position the photosensor 1531 to sense proximate to the tip 1544 and styluses 102(D) and 102(E) position the photosensor and capacitive sensors at opposing ends of the stylus.

Stylus 102(A) can use a light pipe or light tube 1604, such as a fiber optic to gather light at a top 1606 (or other region) of the stylus and transmit the light through the body 1542 of the stylus to the tip 1544. Another light pipe 1610, such as a fiber optic can extend between the tip 1544 and the photosensor 1531. In this case, a point 1612 can protrude beyond the light pipes. In some configurations, the point can include pressure and/or capacitive sensors 1530. In some configurations, the light pipes 1604 and 1610 can culminate at the tip 1544 in a lens or other structure that protects the light pipe and/or focuses light into or out of the light pipe.

Stylus 102(B) can position the LED 1537 and the photosensor 1531 away from the tip 1544 of the stylus. Light pipe 1604 can be used to transmit light between the LED 1537 the tip 1544. Light pipe 1610 can be used to transmit light between the tip and the photosensor 1531. Further in this implementation, the tip can include a concave recess 1614 that includes the end of the light pipes 1604 and 1610 and protects the light pipes from damage. The concave recess 1614 can also allow the exclusion of ambient light when sampling a color from the environment. For instance, if the stylus is held perpendicular to a colored surface, the tip 1544 can block ambient light from entering the recess 1614 and being detected by the photosensor 1531.

Stylus 102(C) is similar to stylus 102(B). However, in this case, light pipe 1610 (shown in ghost) is nested within light pipe 1604 (e.g., a light pipe within a light pipe). In this configuration, light generated by LED 1537 travels down to the tip 1544, and any of the light that is reflected off the colored surface can travel back up light pipe 1610 to photosensor 1531. An alternative configuration can nest light pipe 1604 within light pipe 1610.

Styluses 102-102(C) can include both color sensing elements and capacitive elements positioned relative to tip 1544. In contrast, styluses 102(D)-102(E) have a capacitive tip 1544(1) and an opposite color sensing tip 1544(2). While not specifically illustrated, other implementations can have alternatively deployable tips at a single end of the stylus. For instance, the user can twist a portion of the stylus clockwise to deploy the color sensing elements and store the capacitive elements and then twist the stylus counter-clockwise to store the color sensing elements and deploy the capacitive elements, among other configurations.

Stylus 102(D) includes photosensor 1531 and light source (L S) 1536 coupled to a common or shared light pipe 1604. In this case, the light pipe extends from the light source 1536 to the color sensing tip 1544(2). Light reflected from a surface can travel back up the light pipe 1604. A portion of this light can enter the "Y" shaped branch of the light pipe and ultimately reach the photosensor 1531.

Stylus 102(E) includes light pipe 1604 for light source 1536 and light pipe 1610 for photosensor 1531. In this case, the light pipes are not oriented parallel to one another. Instead, the light pipe 1610 is oriented at an acute angle relative to light pipe 1604 (when measured at the color sensing tip 1544(2)). Further, stylus 102(E) includes an adjustment element 1616. The adjustment element can adjust various parameters relative to the color sensing functionality. For instance, the adjustment element can move light pipe 1604 to change the relative angle between light pipe 1604 and light pipe 1610. In another implementation, the adjustment element 1616 can be manifest as an iris that could be opened wider or focused more narrowly on either or both of light pipes 1604 and/or 1610. In still another implementation, the adjustment element 1616 can change the focal distance of the photosensor 1531. For instance, the user could move the adjustment element 1616 toward the color sensing tip 1544(2) to broaden the view. Moving the adjustment element away from the color sensing tip could narrow the view (e.g., the area of the surface sensed). In other implementations, a similar functionality can be obtained by utilizing exclusively or weighting the value of sensed data from either the center of the sensor or the periphery of the sensor to effectively broaden or narrow the field of view. While illustrated relative to stylus 102(E) adjustment elements can be employed with other stylus implementations.

FIG. 17 shows an example where interaction with stylus 102 can allow the user to adjust the color. In instance one, the stylus 102 is positioned flat against the colored surface. In this case, the color detected by the stylus matches the color of the colored surface (e.g., compare the color in the display to the color of the colored surface). At instance two, the user can adjust the color by manipulating the stylus relative to the colored surface. In this example, the color on the display is a different green (represented by closer lines) than the color of the colored surface. The user can further adjust the color by further tilting the stylus and/or rotating the stylus among others. For instance, tilting the stylus may make the green lighter or darker and twisting the stylus one way may make the green more blue and twisting the other way may make the green more yellow. Note also that the adjustment element 1616 discussed relative to FIG. 16B can provide other ways for the user to adjust the sensed color.

The stylus 102 can also be configured to address specular reflection. Specular reflection can impact the level of saturation of a hue depending on sensing orientation relative to illumination. In some implementations the effect could be used on purpose to allow the user to tilt/tip the stylus 102 to achieve/adjust various levels of saturation of the sample color. Specular reflection can be avoided to sense more accurate color. For instance, strategic placement of photosensors with respect to, and avoiding, the specular reflection component within a plane of incidence about the sample local plane can enhance color accuracy. Specular reflection can be calibrated out of the sensed light by using multiple-angle probing. Alternatively, some implementations can control probing/illumination orientation of the stylus. Some implementations can allow the user to manually control the stylus orientation to affect the amount and/or type of reflection via the natural hand-hold tilt. Holding orientation can select the level of saturation (e.g., 'Y' fiber of FIG. 16B tilted versus normal to surface of the object).

In some implementations, the use of a single light pipe or joined light pipe for both delivery and sensing (e.g., FIG. 16B) can affect the reflective properties. For instance, the light reflected back from the tip surface interface tends to reflect a small percentage of the illumination light back into photosensor 1531. However, the illumination can be substantially higher in optical power than the received light, due to diffuse reflectance and/or light budget (many samples are near-lambertian). Viewed from one perspective, the small percentage of reflected light from the large amount of illuminated light can still be a substantial amount of light. Thus, this back-reflected light can convey background in the form of crosstalk. Some implementations can remove this aspect via calibration. Variation in probe tip over time/use/handling can effect calibration and can lead to inaccuracies for low light sampling over usage. However, as mentioned above, this aspect can be addressed via time averaging.

From one perspective, some implementations can determine both the sample color and a measure of specularity. For instance, the stylus 102 can measure a pattern reflection, rather than just spot reflectance. Some such implementations can utilize a set of light sources at different angles and measure the received light at the photosensor. Such a configuration can enable many 'painting' options, such as the ability to apply mirror-like gloss to objects in 3-D renders.

In some configurations, tip curvature & surface roughness can increase background, or the light that is backscattered into the sensor, without sample in the optical path. This phenomenon can be especially prevalent for the joined fiber scenario described relative to FIG. 16B. If illumination light and the return signal are to be sharing the same fiber, any portion of light that is reflected back into the sensor from the exit interface, such as the tip, can contribute directly to falsely or superficially inflating the signal level. Since this is not really a signal, but instead just a fraction of illumination light, which may be white light, the signal can end up appearing to represent a color of sample object that is more 'washed-out' or less saturated in color than the actual object. A typical air-to-media interface at the tip (without an expensive antireflection (AR) coating) can reflect about 4% on axis. The illumination light power tends to be much, much higher than the signal in order to provide sufficient light to diffusely reflective objects at some finite z distance. Thus, what appears as a seemingly small percentage can end up being a significant contributor to background of the signal. In some cases background level might be considered to be approximately constant and could be calibrated out by subtraction/processing. However, note that the tip can be exposed, and further handling of the tip, such as getting rough, could change the amount of backscatter over usage. Thus, isolated fibers can have a potential advantage over joined fibers having at least some path length that is shared. Another contributor to background is Fresnel reflection off the front surface of samples having a specular component. This issue can be resolved by using probing geometry which avoids or rejects specular reflection from the sample.

In light of the above discussion, some implementations can employ angular rejection/lensed options. These implementations can use spatial filtering to enable angular rejection (i.e., to reduce/avoid the specular component). In such configurations, there can be a tradeoff between the efficiency and the angular acceptance, such that narrower acceptance, which can be desirable for higher resolution probing, tends to be less efficient.

Some implementations can utilize pseudo-collimated fibers. Such configurations can balance various factors, such as working z range, resolution at sample surface, efficiency, light budget, and/or the limitation of sensor responsivity and/or noise.

Some of these implementations can utilize light pipes manifest as 1-1.5 millimeter (mm) optic fibers that can produce resolution on the order of 1.5 mm-2 mm. This can be due to wide angular acceptance of the optic fiber tip combined with stylus hand-hold angle geometry. Other implementations can use smaller or larger fiber optics. For instance, some implementations can utilize fiber optics in the 0.2 to 1.0 mm range.

As mentioned above, some stylus designs can capitalize on a multifocal effect, such as with the use of an annular focus as the adjustment element. These designs can help to push out the $r^2$ rolloff, by achieving a limited flattened irradiance versus z, over a limited range. Other than multifocal effect (over limited z range), resolution and brightness (actual sample vs light path collection efficiency) can be strongly impacted by z distance. Repeatable accuracy may be enhanced through the use of mount-pod or assumed holding angle with sample contact.

As mentioned above, some implementations can allow illuminated and emissive sampling. For instance, the stylus can include the capacity to sense light emitted from a sample surface and act accordingly. For instance, some styluses can perform two quick samples of a surface, one with the stylus' light source on and one with the light source off. If both samples return similar results, the stylus can treat the surface as an emissive surface, such as a digital display surface and use the sample with the light source off. For cases of illumination 'off' mode, the user can grab from displays or even ambient (sky, sunset, etc.). Some implementations can account for the difference in expected level of samples when illuminated vs ambient, since ambient may not be as high as on-board illumination. This could be for samples which are emissive, and there can be a selection of calibration for certain standard scenarios. In summary, the user can manipulate the stylus to capture a palette around the environmental color with or without illuminating the surface.

Figure 18:
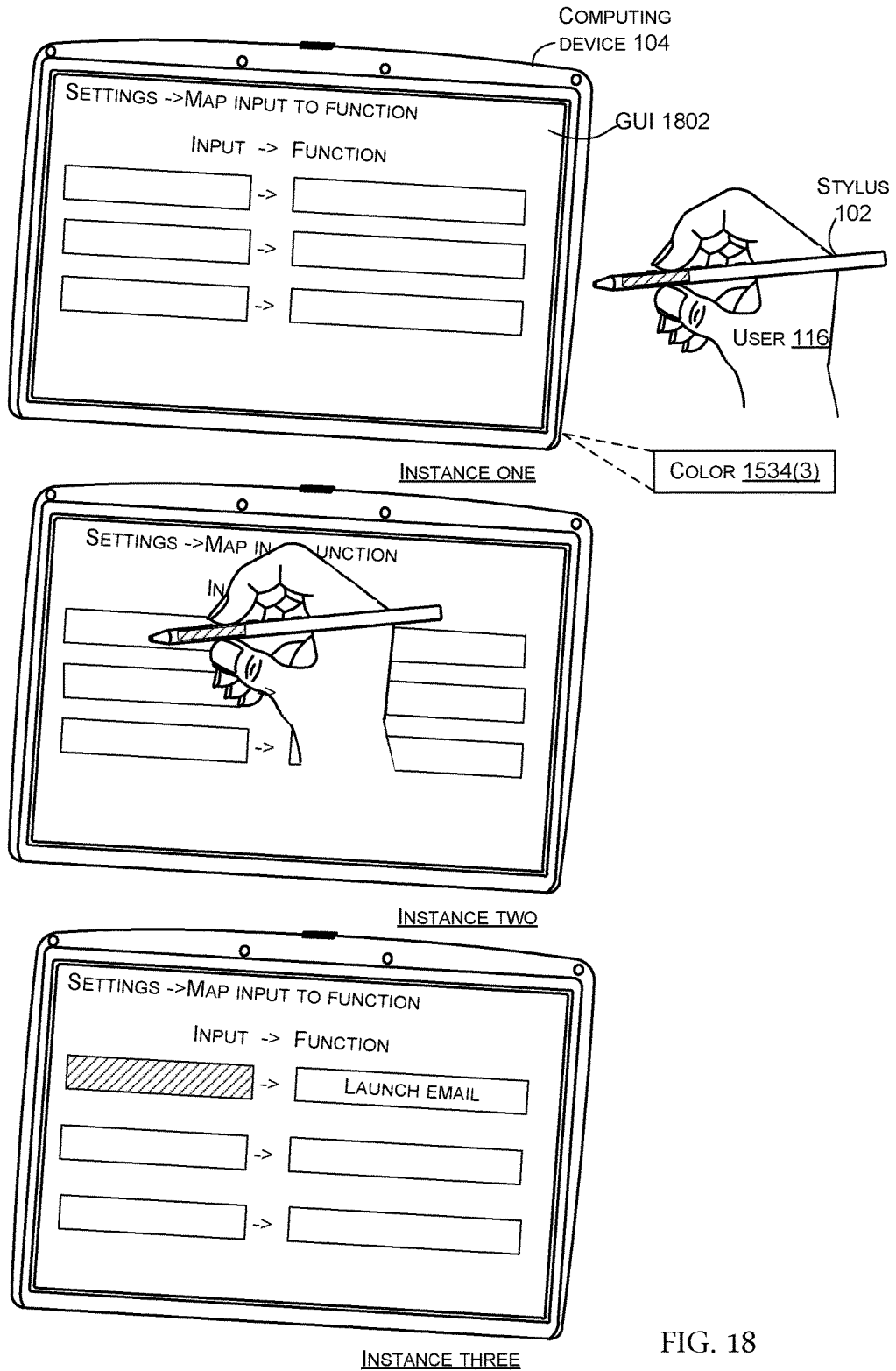
FIG. 18 shows a computing device use case scenario relating to colors in accordance with some implementations of the present concepts.

FIG. 18 shows an example of how the user 116 can set up computing device 104 to accomplish the functionality described relative to FIGS. 7-9. Recall that in FIGS. 7-9, the user utilized color (blue from the vase) to launch his/her email application on computing device 104. In FIG. 18 at instance one, the user can go to a settings graphical user interface (GUI) 1802. The GUI can be generated by and/or leveraged by color component 1534(3) to allow the user to control the computing device via selected colors. The settings GUI can allow the user to map specific input commands to specific functions. At instance two the user can identify with the stylus the color (e.g., the color blue from the vase) as the input command. The user can then enter the function, such as from a drop down list and/or self-created by the user. Instance three shows the results of the user actions of instance two. Instance three shows that the color blue (from the vase) is now mapped to launching the user's email application. Thus, when the user uses the stylus in the manner shown in FIG. 7, the email application is launched as shown in FIG. 7-8.

Viewed from one perspective, the color component can be configured to generate a GUI on the display that allows the user to map colors to functions to be performed by the computing device. The color component can be configured to determine whether an individual color received from the user is mapped to an individual function and to implement the individual function on the computing device.

Example Methods

Figure 19:
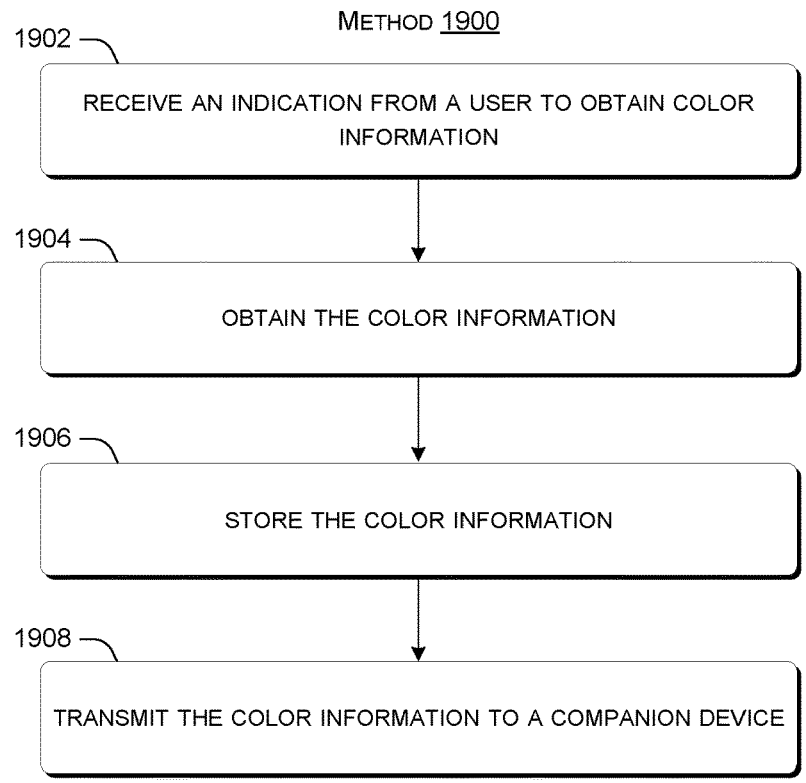
FIGS. 19-21 show example flow charts in accordance with some implementations of the present concepts.

FIG. 19 illustrates a flowchart of a method or process 1900 that is consistent with at least some implementations of the present concepts.

At block 1902, the method can receive an indication from a user to obtain color information.

At block 1904, the method can obtain the color information.

At block 1906, the method can store the color information.

At block 1908, the method can transmit the color information to a companion device.

Figure 20:
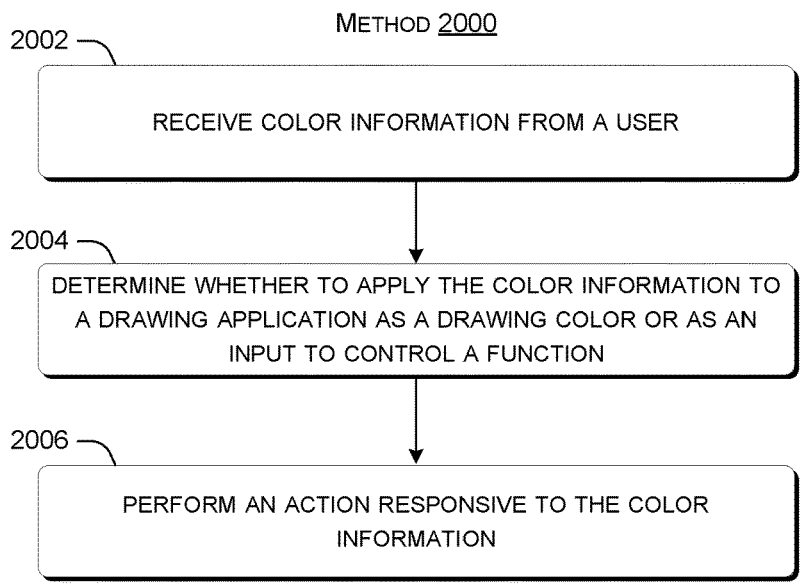

FIG. 20 illustrates a flowchart of another method or process 2000 that is consistent with at least some implementations of the present concepts.

At block 2002, the method can receive color information from a user. In some cases, the color information can be obtained from a stylus that is controlled by the user.

At block 2004, the method can determine whether to apply the color information to a drawing application as a drawing color or as an input to control a different function. In some implementations, in cases where the color is received in the context of the drawing application, the color information can be interpreted as a color selected for drawing by the user. Otherwise, a determination can be made whether the color information is mapped to an input function that does not traditionally relate to 'colors' (e.g., does not relate to colored font/characters, highlighting, drawing, and/or painting, etc.).

At block 2006, the method can perform an action responsive to the color information.

Figure 21:
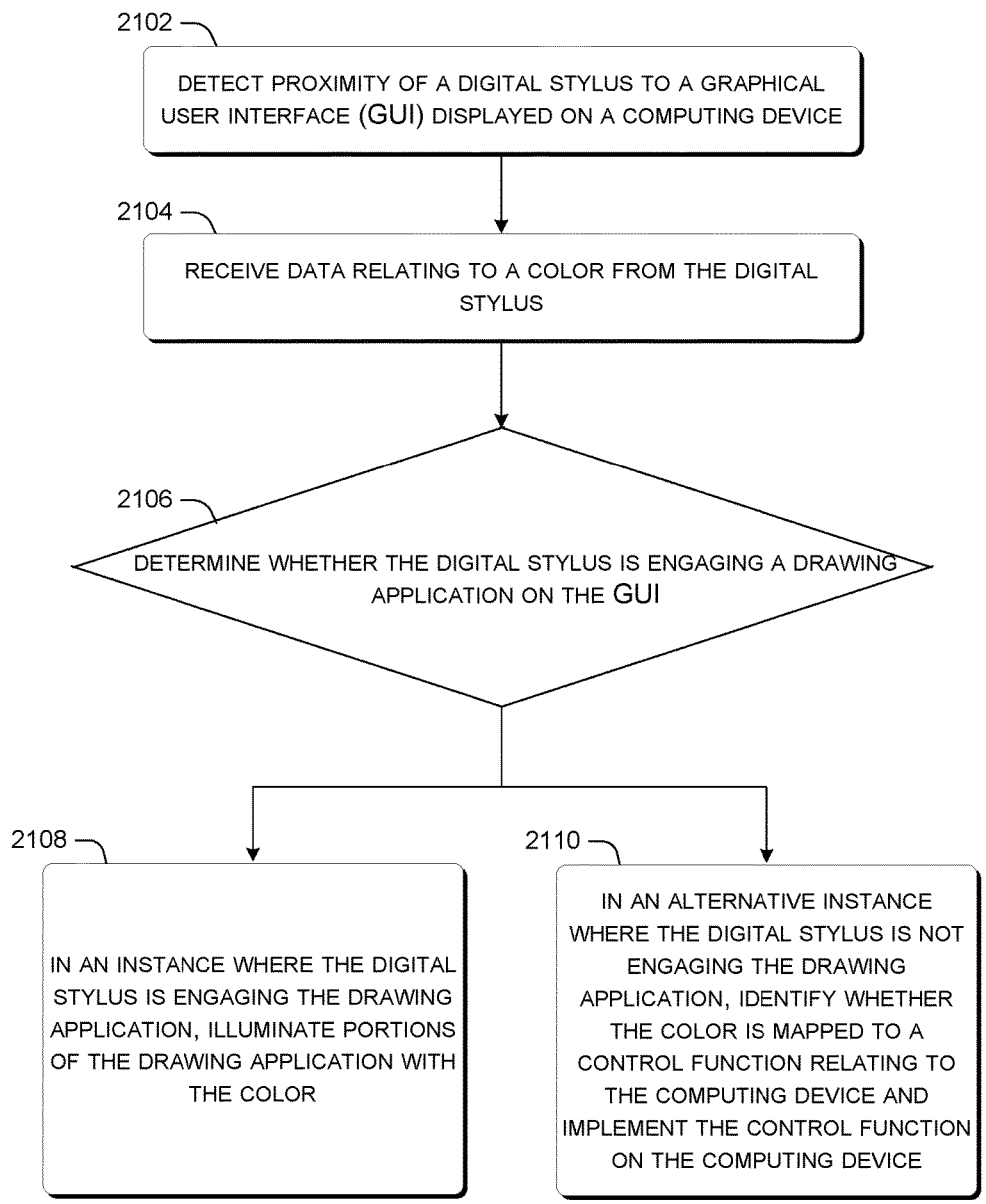

FIG. 21 illustrates a flowchart of another method or process 2100 that is consistent with at least some implementations of the present concepts.

At block 2102, the method can detect proximity of a digital stylus to a graphical user interface (GUI) displayed on a computing device.

At block 2104, the method can receive data relating to a color from the digital stylus.

At block 2106, the method can determine whether the digital stylus is engaging a drawing application on the GUI.

At block 2108, the method can, in an instance where the digital stylus is engaging the drawing application, illuminate portions of the drawing application with the color. For instance, the method can color font, highlight, draw, and/or paint with the color.

At block 2110, the method can, in an alternative instance where the digital stylus is not engaging the drawing application, identify whether the color is mapped to a control function relating to the computing device and implement the control function on the computing device.

The present concepts address several technical problems relating to color styluses and using color to control computing devices. One of the technical solutions can involve allowing a user to define a control function associated with an individual color.

The described methods or processes can be performed by the systems and/or devices described above, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a processor of a computing device causes the computing device to perform the method.

Further Examples

The above discussion relates to color control. One example can include a computing device having a display and a digital stylus configured to capture colors from an operating environment. The digital stylus can be configured to wirelessly communicate data relating to an individual color from the operating environment to the computing device. The computing device can be configured to identify a context of the individual color and to control the computing device based upon the individual color and the context.

The examples of the above and/or below paragraphs, where the display is a touch sensitive display and where the computing device is configured to determine the context at least in part by detecting a location on the display contacted by the digital stylus.

The examples of the above and/or below paragraphs, where the computing device is further configured to determine whether the location is within a drawing application graphical user interface presented on the touch sensitive display.

The examples of the above and/or below paragraphs, where the computing device is configured to detect proximity of the digital stylus to the display and to correlate the color to a location on the display.

The examples of the above and/or below paragraphs, where the computing device is configured to control the computing device based upon the context of the location on the display.

The examples of the above and/or below paragraphs, where the computing device is further configured to allow a user to map the individual color to an individual control function.

The examples of the above and/or below paragraphs, where the computing device is a tablet type computing device or a notebook type computing device.

The examples of the above and/or below paragraphs, where the computing device further includes a color component configured to identify the context of the individual color and to control the computing device based upon the individual color. The color component is an application, an application part, or part of an operating system installed on the computing device.

Another example can include a display and a color component configured to generate a graphical user interface (GUI) on the display that allows a user to map colors to functions to be performed by the computing device. The color component can be configured to determine whether an individual color received from the user is mapped to an individual function and to implement the individual function on the computing device.

The examples of the above and/or below paragraphs, where the color component is part of an operating system of the computing device or part of an application operating on the computing device.

The example of the above and/or below paragraphs further including a communication component configured to wirelessly receive color input from the user via a digital stylus.

The examples of the above and/or below paragraphs, where the display is a touch sensitive display. The computing device is configured to wirelessly receive the color input when the digital stylus contacts the touch sensitive display.

The examples of the above and/or below paragraphs, where the computing device is configured to wirelessly receive the color input when the digital stylus is proximate to but not touching the display.

The examples of the above and/or below paragraphs, where the GUI is configured to allow the user to enter a first color and to define a first function for the first color and to enter a second color and to define a second function for the second color.

The examples of the above and/or below paragraphs, where the color component is further configured to determine whether the user is supplying the color relative to a drawing application.

A further example includes detecting proximity of a digital stylus to a graphical user interface (GUI) displayed on the computing device. The example further includes receiving data relating to a color from the digital stylus. The example further includes determining whether the digital stylus is engaging a drawing application on the GUI. In an instance where the digital stylus is engaging the drawing application, the example includes illuminating portions of the drawing application with the color. In an alternative instance where the digital stylus is not engaging the drawing application, the example includes identifying whether the color is mapped to a control function relating to the computing device and implementing the control function on the computing device.

The examples of the above and/or below paragraphs, where the detecting includes detecting physical contact of the digital stylus with a touch sensitive display upon which the GUI is presented or wherein the detecting comprises detecting the digital stylus via capacitance.

The examples of the above and/or below paragraphs, further including presenting another GUI that allows the user to map the color to an individual control function.

The examples of the above and/or below paragraphs, where the control function comprises associating content with the color or wherein the control function comprises launching an individual application upon receiving the color from the digital stylus.

The examples of the above and/or below paragraphs, where the identifying comprises accessing a table that maps individual inputs to individual control functions.

Conclusion

Although techniques, methods, devices, systems, etc., pertaining to color styluses are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system comprising:
a stylus; and
a computing device, comprising:
   a processor; and
   a computer-readable storage medium storing instructions which, when executed by the processor, cause the processor to:
      at a first time, receive a user input associating a specific data item with a specific color;
      at a second time:
         receive the specific color from the stylus;
         responsive to receiving the specific color from the stylus, retrieve the specific data item that was associated with the specific color by the user input at the first time; and
         display the specific data item on the computing device,
the stylus being configured to capture the specific color from a physical object.

2. The system of claim 1, wherein the instructions, when executed by the processor, cause the processor to:
organize a plurality of different data items by color responsive to other user inputs received from the stylus.

3. The system of claim 2, wherein the plurality of different data items include a plurality of different documents associated with different colors, and the specific data item is one of the plurality of different documents.

4. The system of claim 1, wherein the specific data item comprises an email, a photo, a video, or music associated with the specific color.

5. The system of claim 1, wherein the specific data item comprises a folder associated with the specific color.

6. A computing device, comprising:
a processor; and
a computer-readable storage medium storing instructions which, when executed by the processor, cause the processor to:
   at a first time, receive a first user input designating a specific application to be launched upon receipt of a specific color;
   at a second time:
      receive a second user input identifying the specific color;
      identify the specific application that was designated, by the first user input, to be launched upon receipt of the specific color; and
      launch the specific application in response to the second user input identifying the specific color.

7. The computing device of claim 6, the specific application being an email application.

8. The computing device of claim 7, wherein the instructions, when executed by the processor, cause the processor to:
receive another input identifying another specific color; and
designate a data item within the specific application as being associated with the another specific color.

9. The computing device of claim 8, wherein the specific application is an email application and the data item is an email associated with the another specific color.

10. The computing device of claim 6, wherein the second user input is received from a stylus.

11. A system comprising the computing device of claim 10 and the stylus, the stylus comprising a photosensor configured to capture the specific color from a physical object.

12. A method comprising:
displaying, on a computing device, a graphical user interface comprising a first graphical element for entering different colors as input commands and a second graphical element for entering different functions to be performed in response to the different colors;
at a first time, receiving a first input to the graphical user interface, the first input mapping a specific color using the first graphical element to a specific function using the second graphical element; and
at a second time:
   receiving a second input to the computing device, the second input identifying the specific color; and
   responsive to the second input identifying the specific color, performing the specific function on the computing device.

13. The method of claim 12, further comprising:
capturing the specific color from a physical object using a photosensor on a stylus from which the first input and the second input are received.

14. The method of claim 12, further comprising:
displaying the different functions on the graphical user interface.

15. The method of claim 14, the different functions being displayed in a drop down list.

16. The method of claim 12, wherein the specific function comprises launching a specific application associated with the specific color.

17. The method of claim 12, wherein the first input is received from a stylus.

18. The method of claim 17, wherein the second input is also received from the stylus.

19. The system of claim 1, the stylus comprising a photosensor configured to capture the specific color from the physical object.

20. The computing of claim 6, wherein the instructions, when executed by the processor, cause the processor to:
receive the second user input identifying the specific color when the specific application is not displaying an application-specific graphical user interface on the computing device, wherein launching the specific application in response to the specific color causes the specific application to display the application-specific graphical user interface on the computing device.

* * * * *